United States Patent [19]
Lin et al.

[11] Patent Number: 5,999,610
[45] Date of Patent: Dec. 7, 1999

[54] MANAGING FEATURE INTERACTIONS IN A TELECOMMUNICATIONS SYSTEM SUCH AS AN INTELLIGENT NETWORK

[75] Inventors: Fuchun Joe Lin, Morris Plains; Robert A. Pinheiro, Westfield, both of N.J.

[73] Assignee: Telcordia Technologies, Inc., Morristown, N.J.

[21] Appl. No.: 08/882,276

[22] Filed: Jun. 25, 1997

Related U.S. Application Data

[60] Provisional application No. 60/020,554, Jun. 26, 1996.

[51] Int. Cl.[6] .............................. H04M 3/42; H04M 7/00; H04Q 11/04
[52] U.S. Cl. ...................... 379/201; 370/259; 379/207; 379/230
[58] Field of Search .................................. 379/201, 207, 379/230, 219, 220; 370/259

[56] References Cited

U.S. PATENT DOCUMENTS

| | | | |
|---|---|---|---|
| 5,247,571 | 9/1993 | Kay et al. | 379/207 |
| 5,404,396 | 4/1995 | Brennan | 379/201 |
| 5,418,844 | 5/1995 | Morrisey et al. | 379/207 |
| 5,422,941 | 6/1995 | Hasenauer et al. | 379/207 |
| 5,436,957 | 7/1995 | McConnell | 379/88.23 |
| 5,524,146 | 6/1996 | Morrissey et al. | 379/207 |
| 5,581,610 | 12/1996 | Hooshiari | 379/133 |
| 5,825,860 | 10/1998 | Moharram | 379/219 X |
| 5,920,618 | 7/1999 | Fleischer, III et al. | 379/230 X |

OTHER PUBLICATIONS

"Solutions for Mediated Access to the Intelligent Network" by Wayne Heinmiller, Ron Schwartz, and Marianne Stanke disclosed at ISS '95, Apr. 1995, vol. 2.

*Primary Examiner*—Harry S. Hong
*Attorney, Agent, or Firm*—Elizabeth A. Mark

[57] ABSTRACT

A method for managing communications between a service origination node and a plurality of serving nodes where the serving nodes are simultaneously active for a particular trigger to thereby generate a reply to the service origination node. The method includes the step of determining control options for each trigger indicative of service categories by capturing service interaction principles supplied by a serving node services expert acting as a mentor. The service interaction principles are based upon a requirement of executing service categories in each of the serving nodes for each trigger. The method also includes the step of controlling execution of each of the service nodes and the service categories for the particular trigger with reference to the control options to generate the reply.

23 Claims, 9 Drawing Sheets

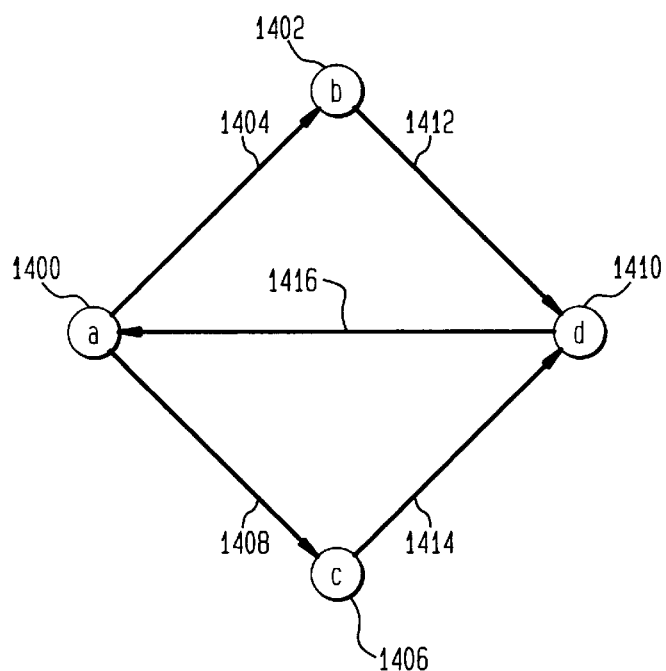

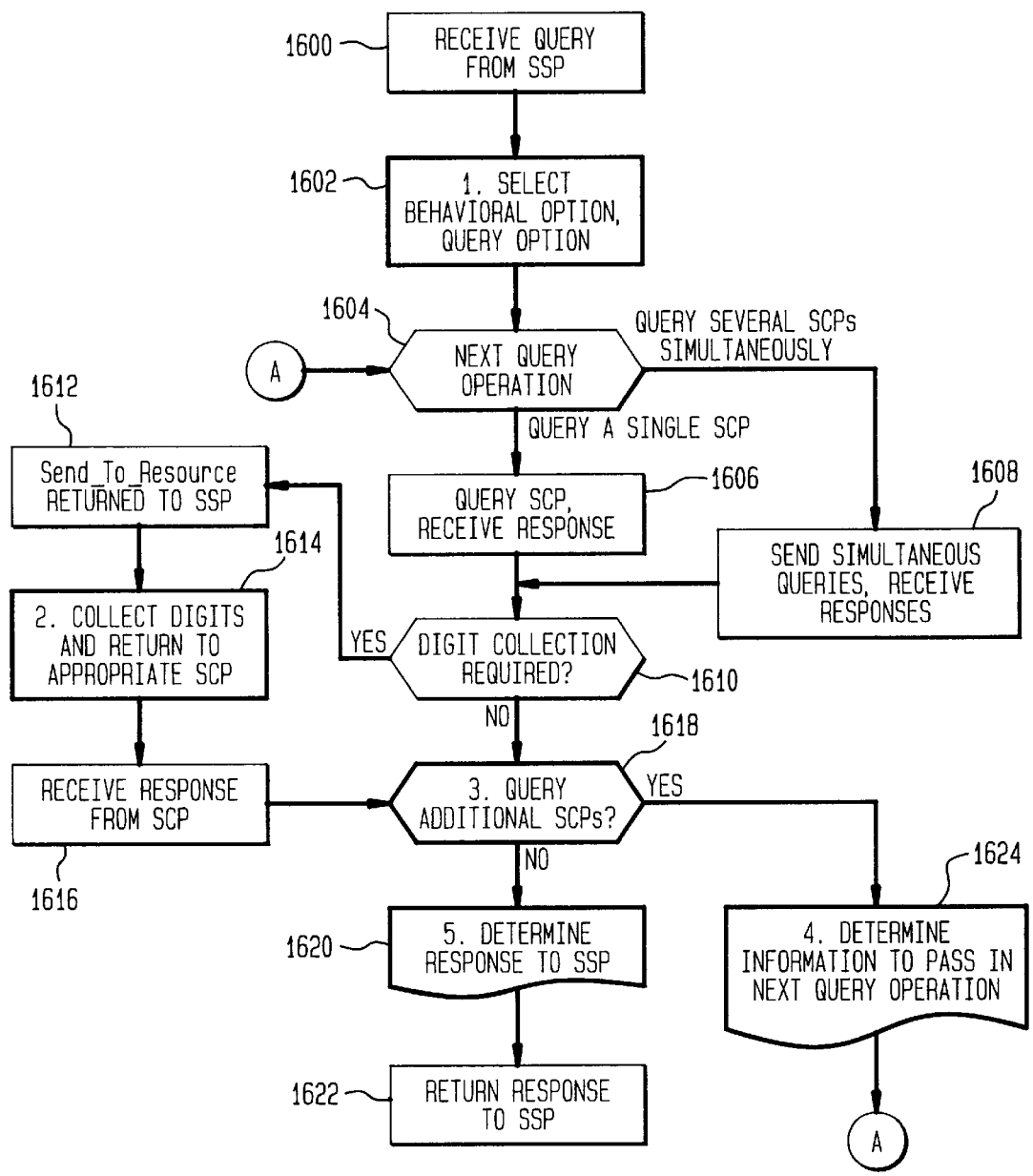

MANAGING FEATURE INTERACTIONS IN A TELECOMMUNICATIONS SYSTEM SUCH AS AN INTELLIGENT NETWORK

CROSS-REFERENCE TO RELATED APPLICATION

This is a nonprovisional application of provisional application Ser. No. 60/020,554 filed Jun. 26, 1996.

FIELD OF THE INVENTION

The present invention relates to a telecommunications network and, more particularly, to a method for generating and using controlling logic for management of communications among nodes in an Intelligent Network (IN) such as the Advanced Intelligent Network (AIN).

BACKGROUND OF THE INVENTION

The AIN is a network architecture used by all modern telephone switching systems in the United States. The AIN is applicable to all telecommunications networks (e.g. Public Switched Telephone Networks (PSTNs) including Integrated Services Digital Networks (ISDNs)), narrowband, broadband, packet-switched public data networks, and mobile telephone networks. FIG. 1 represents a simplified diagram of the AIN configured by a Local Exchange Carrier (LEC). The components of the AIN include: (i) a central office 102 containing a switching system 104 such as a Service Switching Point (SSP); (ii) a signaling network 106 composed of a multi-level hierarchy of Signal Transfer Point (STPs) which act as intermediate switching nodes; and (iii) a Service Control Point 108 (SCP) which contains a centralized database. Each of the central offices 102 is equipped with a SSP 104. In, AIN, the SSP 104 is a switch that can recognize a call that requires AIN processing by the SCP 108.

To exemplify a service provided by the AIN, consider a customer placing a telephone call that requires special handling, such as a toll-free call (800 service). The call is intercepted by the switching system 104 which launches a query through the signaling network 106 to a centralized database located in the SCP 108. The database, in turn, retrieves the necessary information to handle the call, and performs a number translation to map the "logical" 800 number to a "physical" routing number. The physical routing information is returned through the signaling network 106 to the switching system 104 so that the call can be completed. Number translation is an example of one of a plurality of so-called service categories defined for the AIN. Each service category serviced by the SCP 108 is composed of the logic that handles the query/reply transaction between the SSP 104 and the SCP 108.

FIG. 1 also shows multiple subscriber lines 110, typically on the order of 10,000 to 70,000 lines, which are connected to each central office 102. Each of the subscriber lines 110 are connected to a terminating piece of telephone equipment 112. This telephone equipment 112 can include telephone sets, facsimile machines, computers, and automatic dialers. Trunk circuits 114 interconnect the central offices 102 and are the voice path that connect inter-office communications when calls are completed.

Triggering is the process used by the SSP 104 to identify calls that require special handling by the AIN. The SSP 104 has the appropriate hardware and software so that when a set of predetermined conditions are detected, the SSP 104 will encounter a trigger 116 in response to activity on the dialing lines. A trigger 116 is an event associated with a particular subscriber line 110 that generates a query to be sent to the SCP 108. A trigger detection point (TDP) is a point in call processing where service logic can receive notification of a given event and influence subsequent call processing. The trigger 116 includes information for identifying particular subscriber lines 110 when a piece of telephone equipment connected to a line goes off-hook, commences dialing, etc. Once a trigger 116 is encountered, the SSP 104 temporarily suspends call processing. Each trigger 116 generates a query in the form of a data packet launched by the SSP 104 to the SCP 108 to ask for instructions on how to handle the call and obtain the required call handling information. The data packet is first sent via bidirectional data links 118 utilizing the Signaling System 7 (SS7) protocol to the STP 106. The SS7 distributes data packets on an equal basis over multiple physical links that connect two points, namely the SCP 108 and STP 106. The STP 106 is a very high capacity, very reliable packet switch that can transport messages between network nodes such as the SSP 104 and SCP 108. The STP 106 essentially directs traffic on the network and routes the data packet to its intended destination (i.e. the SCP) via high speed data links 120.

The SCP 108 is a fault tolerant transaction processing system that contains various centralized databases that provide the appropriate call routing information and identify particular subscribers. The SCP 108 responds to a request (i.e. trigger) received from the SSP 104. The trigger 116 causes the SCP 108 to query its databases to determine whether some customer calling feature or enhanced service should be implemented for this particular call or whether conventional dial-up telephone service should provide for the call. The results of the database query are sent back in the form of a return packet over the data links 120 through the STP 106 and onward through data links 118 to the SSP 104. The return of the packet includes instructions to the SSP 104 on how to continue processing the call.

Open access to the AIN operated by LECs to third parties will exploit the capabilities and efficiencies of third party service providers and enable these third parties to provide competitive telephone related services to local LEC subscribers.

Representative of an approach of the prior art which relates to providing open access to the AIN to exploit third party capabilities and efficiencies is the paper entitled "Solutions for Mediated Access to the Intelligent Network" by Wayne Heinmiller, Ron Schwartz, and Marianne Stanke disclosed at ISS '95, April 1995, Vol. 2. The paper proposed a service architecture that allows access to the IN from a SCP belonging to any service provider and defines a set of new network functions referred to as mediation which reside in a network element labeled the mediation point (MP). The resulting logical network architecture is shown in FIG. 2. The key attribute of this architecture is the MP 200 which is the point of interconnection for the service provider's SCP (108, 202, and 204 respectively) and the SSP 104. The MP 200 is situated between the SSP 104 and a number of SCPs (SCP 108, SCP 202, and SCP 204). Data link 206 connects the MP 200 to the SSP 104. Data links 208, 210, and 212 connect the MP 200 to the SCP 108, 202 and 204 respectively. The MP is intended to be transparent to the transactions between the SSP and SCPs.

So-called "feature interactions" in a distributed call processing environment such as the IN become a problem when using the architecture depicted in FIG. 2. The phrase "feature interactions" describes, for example, the outcome of an action which invokes execution by a plurality of SCPs servicing the features. For instance, if A represents a feature serviced by one SCP and B another feature serviced by another SCP, then different outcomes are possible if A and B are queried: (i) sequentially with A first; (ii) sequentially with B first; or (iii) simultaneously. Regarding this problem, the paper states that a successful solution must prevent destructive side-effects, support multiple independent service providers, and have no knowledge of the actual service particulars while satisfying all of the users' service requirements—this is a very difficult, if not impossible, task. In addition, the ability to combine services must be customizable to meet the particular needs of each user, and the ability to do so should be open to competition and not be the sole purview of the telephone administration.

After considering the above mentioned factors, the authors of the paper conclude that the need for a universal, generic solution to feature interactions is not possible, and probably not even desirable. Service providers want the resolution of feature interactions to be located outside the network, where any service provider can work with users to customize solutions based on that user's needs. Alternatively, the user can work with a "services broker" who will consult with the user to select one or more service providers and consider appropriate interactions. Since feature interactions often require a greater degree of communications, the authors foresee the need for direct SCP-to-SCP connections among service providers to mitigate feature interaction effects. The SCP-to-SCP connections would occur if the service providers determine it is to their benefit to deliver improved feature interactions to their customers.

To date, much of the other work accomplished to provide open access to the AIN operated by LECs has assumed that for any given subscriber (i.e. LEC customer who subscribes to one or more service categories invoked by a particular trigger), all service categories invoked by encountering a particular trigger would have to be provided by the same service provider system. In other words, only a single SCP would have access to a specific trigger active on a given subscriber's line. A SCP can be owned by a LEC or a third party.

There are problems inherent in only a single SCP having access to a specific trigger active on a given subscriber's line. For example, this greatly limits the number of services or service combinations a subscriber may have, and diminishes the original intent of opening the AIN to third parties. In addition, it allows one service provider to monopolize a particular trigger active for a given subscriber, because no other service provider can subsequently provide a service to that subscriber using the same trigger. Thus, a need still exists to provide open access to the AIN so that capabilities and efficiencies of third parties can be exploited.

Moreover, as elucidated above, the teachings and suggestions in the prior art suggest a universal, generic solution to the feature interaction problem is virtually impossible. This pedagogy provided by the teachings and suggestions of the prior art serve as a point of departure from the art in accordance with the subject matter of the present invention. There are no known attempts to create a general methodology to generate and use controlling logic for management of communications among nodes in an AIN and, in particular, feature interactions in a SSP-multiple SCP environment.

SUMMARY OF THE INVENTION

These shortcomings and limitations of the prior art are obviated, in accordance with the present invention which is a method for managing communications between a service origination node and a plurality of serving nodes where the serving nodes are simultaneously active for a particular trigger to thereby generate a reply to the service origination node. The method includes the step of determining control options for each trigger indicative of service categories by capturing service interaction principles supplied by a serving node services expert acting as a mentor. The service interaction principles are based upon a requirement of executing at most one of the service categories in each of the serving nodes for each trigger. The method also includes the step of controlling execution of each of the service nodes and each corresponding one of the service categories for the particular trigger with reference to the control options to generate the reply.

The organization and operation of this invention will be better understood from a consideration of the detailed description of the illustrative embodiments thereof, which follow when taken in conjunction with the accompanying drawings.

BRIEF DESCRIPTION OF THE DRAWINGS

Various embodiments of the present invention are described and illustrated herein with reference to the drawings in which like items are indicated by the same reference designation, in which:

FIG. 14 shows a graph which is not a partial ordering;

FIG. 15 shows an illustrative embodiment of a subscriber record; and

FIG. 16 illustrates the common logic template for defining controlling logic for an illustrative embodiment of the present invention.

DETAILED DESCRIPTION

The present inventive subject matter focuses on the interoperability caused by service interactions in a multiple SCP environment. The complexity of the multiple SCP interoperability issues on a trigger depends on the number of SCPs (two, or more than two), and the nature of the services (containing a single category of features or multiple categories of features). Various illustrative embodiments of a methodology that enables LEC and/or other service providers to generate controlling logic for managing service interactions in a multiple SCP interoperability environment are elucidated.

A first illustrative embodiment of a methodology is operational whenever there are only two SCPs having simultaneous access to a single trigger (per subscriber) and the services contain a single category of features.

A second illustrative embodiment of a methodology is operational whenever there are only two SCPs having simultaneous access to a single trigger (per subscriber) and the services contain multiple categories of features.

A third illustrative embodiment of a methodology is operational whenever there are two or more SCPs and the service contains a single category of features.

Figure 1:
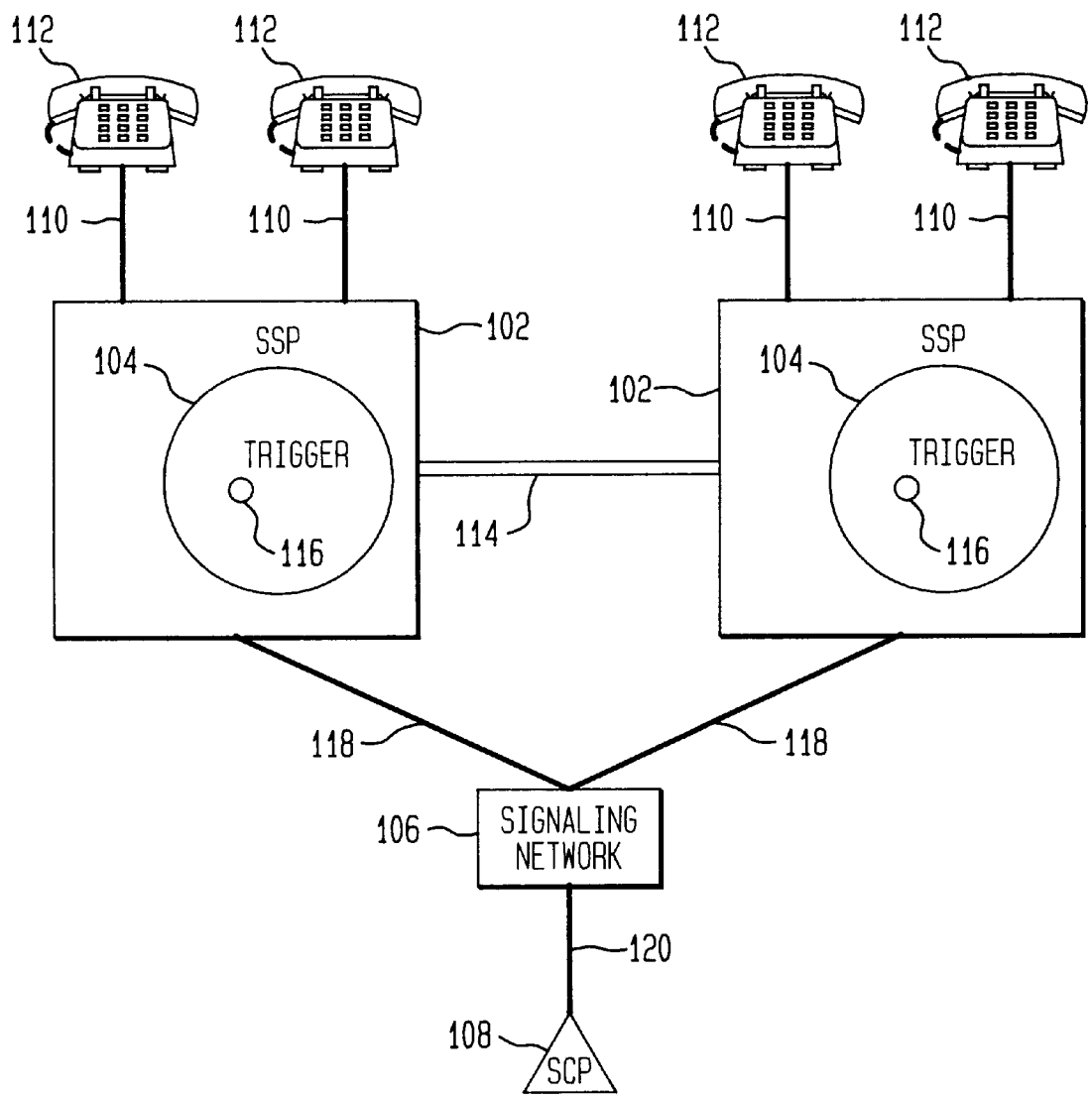
FIG. 1 is a block diagram of a traditional AIN.
Figure 2:
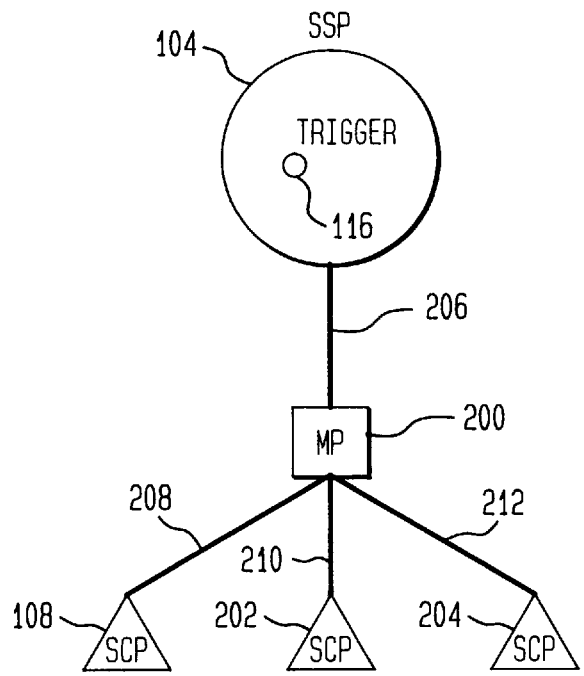
FIG. 2 is a block diagram of a prior art logical network architecture of the AIN which includes the functional element called the MP.
Figure 3:
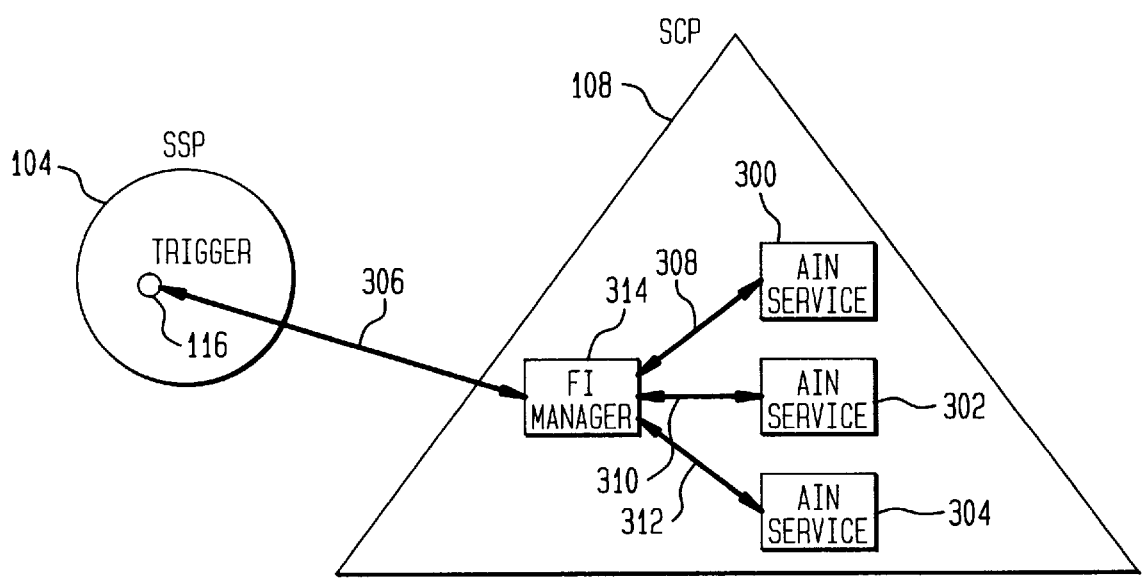
FIG. 3 shows an illustrative embodiment of a physical network architecture for multiple services on a trigger where the services reside on the same SCP.

To place in perspective the detailed description of the present invention, it is instructive to first focus on some illustrative embodiments of physical network architectures in which the various methodologies can be implemented. FIG. 3 shows an illustrative embodiment of a physical network architecture for multiple services on a trigger where all the services and the feature interaction manager (FIM) reside on the same SCP. When a trigger 116 occurs in SSP 104, information in the form of a query is sent to the FIM 314 which is physically located in the SCP 108. The FIM 314 interacts with a number of AIN services 300, 302, and 304 respectively, which are associated with the SCP 108. Data link 306 connects the SSP 104 to the SCP 108. The FIM 314 communicates with the AIN services 300, 302, and 304 via information flows 308, 310 and 312.

Figure 4:
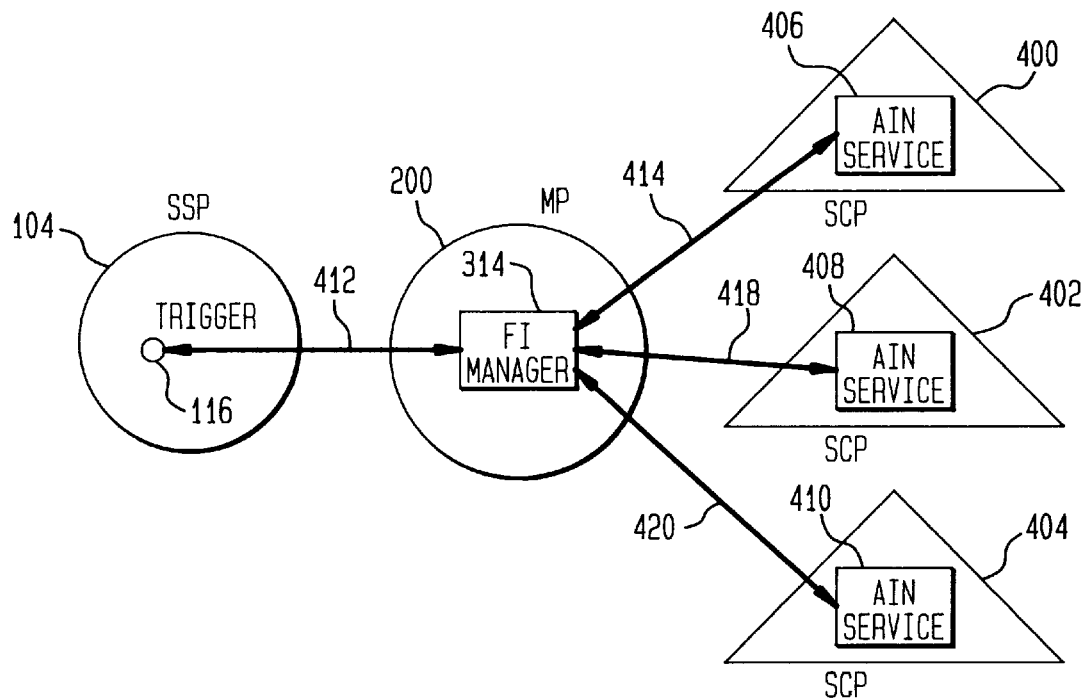
FIG. 4 shows an illustrative embodiment of a physical network architecture for multiple services on a trigger where the services are distributed on multiple SCPs.

FIG. 4 depicts an illustrative embodiment of a physical network architecture for multiple services on a trigger where the services are distributed on multiple SCPs. Similar to FIG. 3, when a trigger 116 occurs in the SSP 104, information is sent to the FIM 314 which resides on an MP 200. Physically information is sent to the MP 200. Logically the information must be processed by the FIM 314 within the MP 200. Here, the MP 200 is a separate network component situated between the SSP 104 and a number of SCPs (i.e. SCP 400, SCP 402, and SCP 404, respectively). The services 406, 408 and 410 can be distributed over different SCPs. The rationale of having a MP 200 for the management of feature interactions is to minimize the impact on the existing SSP and SCPs—the SSP can still behave as if it communicates with only one SCP when a trigger is encountered because of the existence of the MP, and the SCP can interact with the MP in the same way as it does with the SSP. Data links 412 through 420 enable communication between nodes.

It is understood that FIG. 3 and FIG. 4 depicting the physical network architectures are merely illustrative of the architectures that can be utilized with the various methodologies. Those skilled in the art will recognize, for example, that in FIG. 4, the MP could also be part of the SCP or alternatively part of the SSP rather than a separate network component. In addition, the term "mediation point" (i.e. MP) is used solely to designate the platform which supports the feature interaction manager. Use of this term does not imply that any other types of "mediated access" is present. The term "gateway" could also be used to designate this platform.

Available Triggers

In order to develop each illustrative embodiment of the methodology, explanation of the available triggers is a prerequisite. This is necessary since, although the SSP supports several types of triggers at several points in call processing, there are only a limited number of triggers available for the provisioning of service categories. Any third party services having simultaneous access to a multiply-subscribed trigger will fall into one (or more) of these categories. A multiply-subscribed trigger occurs if several SCPs have the ability to provide a service to a given subscriber when a particular trigger is encountered on the subscriber's line. The trigger definitions are consistent with Bellcore's AIN 0.1 Generic Requirements (TR-NWT-001284).

Triggers 116 may be subscribed (i.e. subscriber-based) or office-based. If a trigger 116 is subscribed, then only calls originating on a facility or facility group that subscribes to that trigger 116 or terminating to a Directory Number/Call Type (DN/CT) that subscribes to it can encounter it. If a trigger is office-based, any call that meets the trigger criteria encounters the trigger.

Triggers 116 can occur during originating call processing or during terminating call processing. During originating call processing, triggers 116 can occur at any one of the following TDPs: (i) Origination Attempt—after the SSP 104 received a call setup request (e.g. off-hook); (ii) Information Collected—after the SSP 104 has enough information to process the call; (iii) Information Analyzed—after the SSP 104 has analyzed the information received; and (iv) and Network Busy—when all routes associated with an Automatic Flexible Routing Table are unavailable.

Triggers originating during call processing that may be multiply-subscribed by third-party service providers include: (a) Off Hook Delay (OHD); (b) 3/6/10 Public Office Dialing Plan (3/6/10 PODP); (c) Public Office Dialing Plan Feature Code (PODP FC); and (d) N11.

(a) An OHD trigger is a subscribed trigger which is detected when the SSP receives enough information to process the call, except that this trigger shall not be detected if the information received violates the dialing plan in force. The TDP is Information Collected.

(b) Regarding the PODP FC trigger, this is a subscribed trigger and the SSP shall detect this trigger when specified vertical service codes (e.g. *XX) are dialed. The PODP specifies the vertical service codes (e.g. *XX) that cause the PODP FC trigger. The TDP is Information Analyzed.

(c) For the 3/6/10 PODP trigger, the SSP shall detect a this trigger on any call with access to the PODP when the appropriate North American Numbering Plan (NANP) number is dialed. The 3/6/10 PODP trigger is office-based and the trigger criteria are specified in 3-, 6- or 10-digit patterns. Examples of 3/6/10 Digit triggers are NPA codes, Service Access Codes (e.g. 700, 800, and 900), NPA-NXX codes, Service Access Code-NXX codes, or NPA-NXX-XXXX codes. The TDP is Information Analyzed. (d) For the N11 trigger, the SSP shall detect a N11 Trigger on any call with access to the PODP when a designated N11 number is dialed. The N11 trigger is office-based and the TDP is Information Analyzed.

A trigger that occurs during terminating call processing is a Termination Attempt (TAT) (i.e. when the SSP recognizes that a call is to terminate to a Directory Number (DN) on the switch). This is a terminating trigger that may be subscribed trigger and the SSP 104 shall detect this trigger when the call reaches the Termination Attempt TDP and terminates the DN/CT.

A call encounters a trigger when the following conditions are met: (1) call processing has reached the appropriate TDP; (2) either the trigger is office-based or the trigger is subscribed and the call is originating from a subscribing facility or is terminating to a subscribing DN/CT; (3) the trigger criteria are met; and (4) the trigger is active (i.e. armed).

I. Single Category Services—Two SCPs

Phase I—Service Categories

In this first phase, the types of third party services having simultaneous access to a multiply-subscribed trigger are classified into several service categories.

Based on the available triggers listed above, the types of services that may be provided at SCPs and made available to subscribers can be classified into at five categories: (1) Screening services; (2) Routing services; (3) Call logging services; (4) Data display services; and (5) Forwarding services. Moreover, the Routing services can be further classified into Number Translation services and Carrier Selection services. Each service provided at a SCP contains one or more of these categories. If a service provided at a SCP contains only one of these features it is called a single category service. If a service contains more than one of these features, it is called a multiple category service (which is the subject matter of the Section II).

Screening Services: A screening service may be based on either an originating trigger, or a terminating trigger. A screening service is one that screens incoming or outgoing calls based on some information pertaining to the incoming or outgoing call. If the call passes the screen, call processing is allowed to continue. If it fails the screen, the call is routed to an announcement and/or disconnected. For example, screening of incoming calls may be based on the Calling Party Number (i.e. the telephone number of the party placing the call), while screening of the outgoing call may be based on the Called Party Number (i.e. the telephone number of the party being called). Screening services may require that parties to these calls be able to enter additional digits (such as Personal Identification Numbers (PINs)), so that calls initially failing the screen will pass the screen based on the additional information. A PIN is a combination of alphanumeric characters entered by the subscriber.

Routing Services: A routing service is based on an originating trigger. A routing service routes an outgoing call to either a different DN, or to an alternative carrier, for delivery.

Number Translation Services: A number translation service is based on an originating trigger. A number translation service routes an outgoing call to a different DN for delivery.

Carrier Selection Services: A carrier selection service is based on an originating trigger. A carrier selection service routes an outgoing call to an alternate carrier for delivery.

Call Logging Services: A call logging service may be based on either an originating trigger, or a terminating trigger. A call logging service keeps a record of incoming or outgoing calls, based on criteria that may be specified as part of the service. Criteria may include the Called Party Number or Calling Party Number, as well as the time at which the call was placed (received).

Data Display Services: A data display service is based on a terminating trigger. A data display service displays information to the called party about an incoming call. Examples include Caller ID (i.e. identifies the telephone number of the calling party) and Calling Name Delivery (i.e. identifies the name of the calling party).

Forwarding Services: A forwarding service is based on a terminating trigger. A forwarding service forwards an incoming call to another DN or location. Only unconditional forwarding services are allowed (i.e. calls cannot be forwarded on busy or no answer).

The categories of third party services described above need to be further refined for the purpose of developing controlling algorithms. Distinguishing services offered on the originating trigger from those offered on the terminating triggers, and also services which are subscribed (i.e. active on a particular subscriber's line) from those which are office-based (i.e. active for anyone who dials specific characters) must be established. TABLE 1 enumerates those service categories (together with trigger and allowed response messages) which are important in developing the controlling algorithms. The response message column contains the response messages that are typical in an AIN environment and SCPs typically should return these in response to queries from the MP. Any other response messages other than those in TABLE 1 will be treated as exceptions.

TABLE 1

| Service Categories | Trigger | Response Message(s) |
| --- | --- | --- |
| screening service (originating) | OHD | Analyze_Route, Disconnect, Send_To_Resource |
| screening service (terminating) | TAT | Authorize_Termination, Disconnect, Send_To_Resource |
| routing service (subscribed) | OHD or PODP FC | Analyze_Route, Continue (PODP FC only) |
| routing service (office-based) | 3/6/10 PODP or N11 | Analyze_Route, Continue |
| logging service (subscribed, originating) | OHD | Analyze_Route |
| logging service (subscribed, terminating) | TAT | Authorize_Termination |
| logging service (office-based) | 3/6/10 PODP or N11 | Analyze_Route, Continue |
| data display service | TAT | Authorize_Termination |
| forwarding service | TAT | Forward_Call Authorize_Termination |

Phase 2—Algorithmic Development

One illustrative embodiment of a first methodology in accordance with the present invention to generate controlling algorithms includes three phases: service classification, as just discussed; algorithmic development; and pre-provisioning analysis. This first methodology allows only two SCPs to have simultaneous access to a single trigger.

Using the service category defined during the first phase, the second phase of the methodology describes how a controlling algorithm is defined for some particular combination of service categories having simultaneous access by two SCPs to a single trigger active on a particular subscriber's line. These algorithms embody the controlling logic, and are needed to define the interactions between an SSP and these SCPs when a particular trigger is encountered. These algorithms will form the basis of management capabilities that must be deployed to support simultaneous access.

The minimum amount of knowledge required to apply the methodology during the second phase consists of knowing the classification of the services having simultaneous access to a particular trigger (for some subscriber). Depending on what those service categories are, the algorithm specified during this phase may or may not be dependent upon additional subscriber-specific information about how the services should behave together when the relevant trigger is encountered. Those algorithms for which additional subscriber information is needed are called subscriber-dependent algorithms. Subscriber-dependent means that they depend on knowledge of subscriber expectations about how the services are to behave when the relevant trigger is encountered. However, because subscriber-specific information is unavailable during this phase, the methodology allows the generation of subscriber-dependent algorithms based upon assumptions about these subscriber expectations which are embodied in various default rules. The algorithms need to embody the logic necessary to provide (at minimum) a determination of whether the service providers may be queried simultaneously (order independence), or whether they must be queried sequentially (order dependence). For sequential queries, determination of query order, and mediation actions after receiving each SCP response is necessary. For simultaneous queries, formulation of a single response to the SSP after receiving all SCP responses is required.

Figure 5:
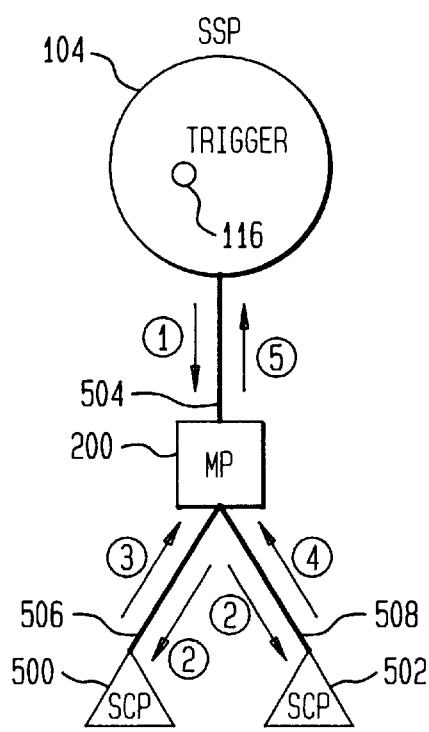
FIG. 5 shows the flow of communication when two SCPs are queried simultaneously.
Figure 6:
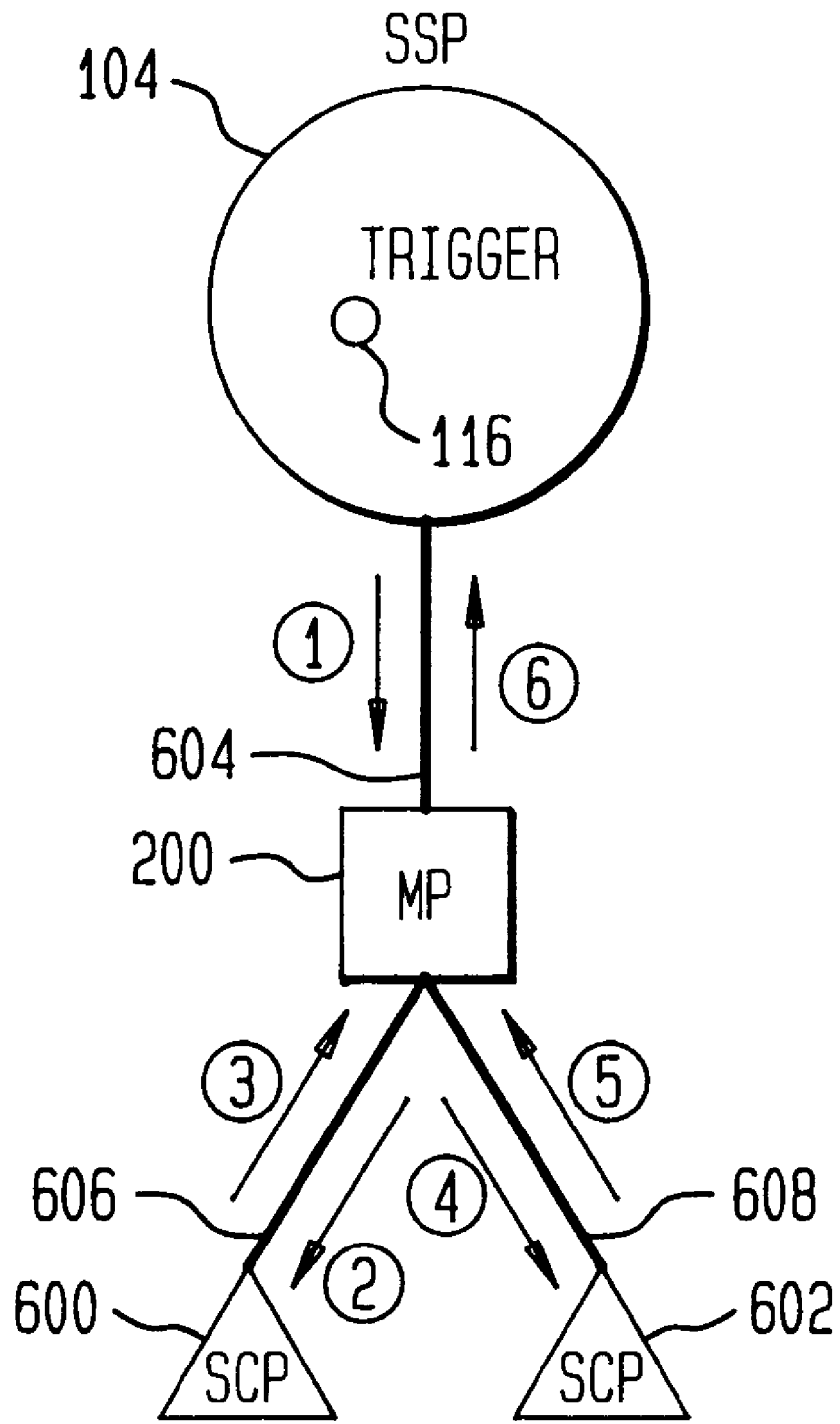
FIG. 6 shows the flow of communication when two SCPs are queried sequentially.

FIG. 5 and FIG. 6 show the flow of communication between the SSP, an interposed MP shown for this illustrative embodiment, and SCPs when the SCPs are queried simultaneously and sequentially, respectively. The flow of communication is labeled by arrows and the event numbers delineate the order for which the events will occur. In particular, for FIG. 5, at event 1, the SSP 104 encounters a trigger 116 and sends a message to the MP 200 over data link 504. Next, at event 2, the MP simultaneously sends a message to SCP 500 and SCP 502 using data links 506 and 508, respectively. At event 3, SCP 500 returns a response to the MP 200 using data link 506. At event 4, SCP 502 returns a response to the MP 200 using data link 508. Finally, at event 5, the MP 200 then formulates and returns a response to the SSP 104 which then routes the call.

Turning now to FIG. 6, this diagram shows the flow of communication when SCPs are queried sequentially. At event 1, the SSP 104 encounters a trigger 116 and sends a query to the MP 200 over data link 604. The MP 200 queries one SCP at a time according to some sequence, waiting for a response before querying the next SCP. The MP 200 formulates a message to be sent via data link 606 to SCP 600 at event 2. The MP 200 awaits a response from SCP 600 at event 3. The MP 200 will query the second SCP 602 at event 4 over data link 608 and await a response from SCP 602 at event 5. The MP 200 will then formulate a response to be returned to the SSP 104 at event 6 concerning instructions for processing the call. Alternatively, based on the response received by SCP 600, the SCP 602 may not be queried and a response will be formulated and returned to the SSP 104.

Common Logic Template

Algorithms specified during the second phase of the methodology are based on a common logic template. This logic template embodies a generic logic flow that each algorithm incorporates. In the logic flow of the template, there are points which are identified as knowledge intensive tasks. For each combination of service categories having simultaneous access to a multiply-subscribed trigger, the methodology specifies how each of these knowledge intensive tasks are to be resolved. In other words, what distinguishes one algorithm from another is the way in which each of these knowledge intensive tasks are resolved.

Figure 7:
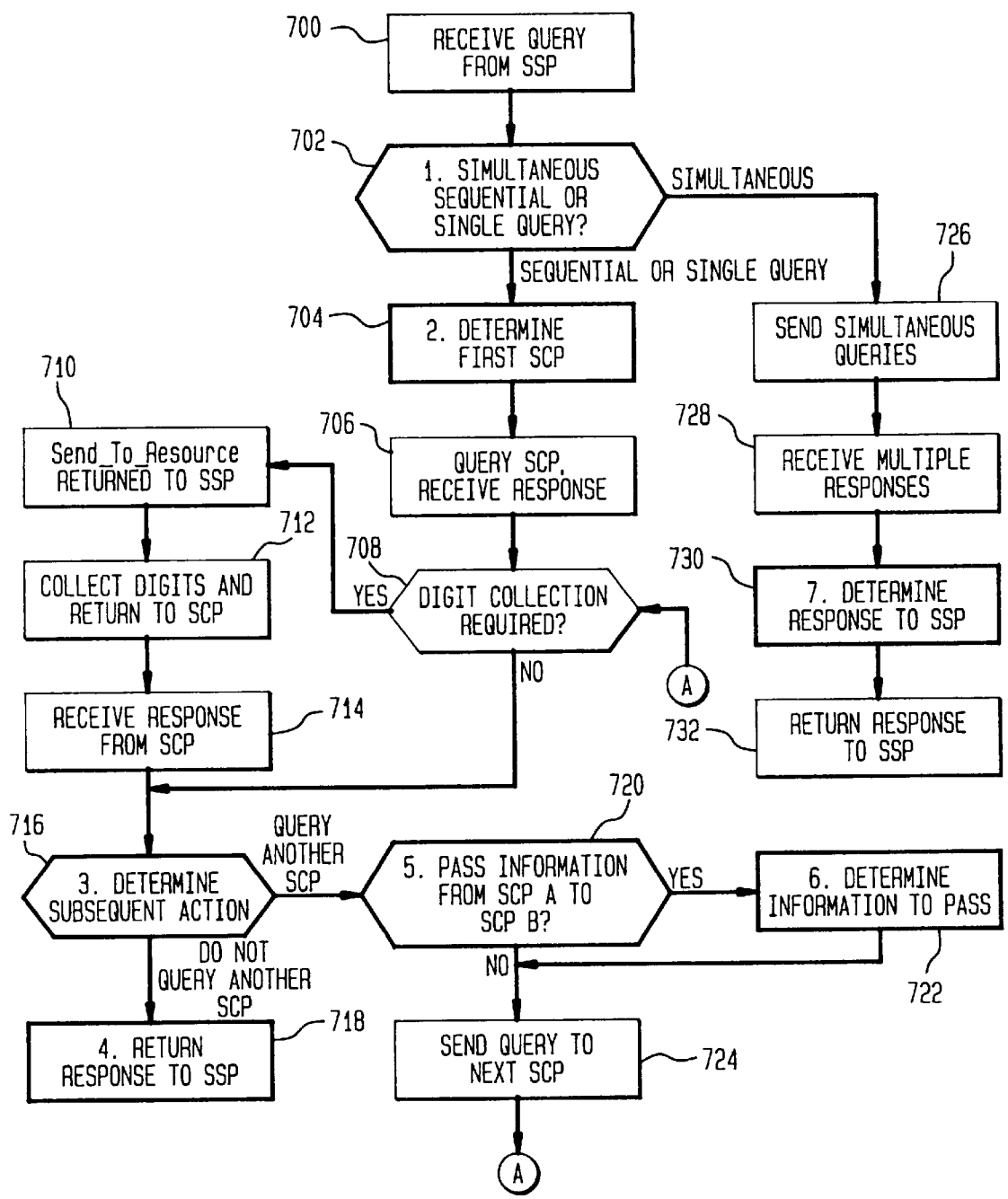
FIG. 7 illustrates the common logic template for defining algorithms for an illustrative embodiment of the invention.

Turning now to FIG. 7, this illustrates the common logic template that will serve as the basis for defining algorithms for controlling communications with multiple SCPs when these providers have simultaneous access to a particular trigger (for some subscriber). This logic flow is illustrated in terms of tasks that must be performed by a controlling algorithm, together with the relationship between these tasks. An algorithm will be specific to the types of services having simultaneous access to the subscriber's trigger, and will be executed at the MP when a multiply-subscribed trigger is encountered at the SSP.

The logic template designates various tasks that must be resolved by the algorithm at run-time. Some of these tasks are generic in the sense that they do not depend upon any service-specific or subscriber-specific knowledge. For instance, one of the decision points in the template depends upon whether digit collection is required. To resolve this, it is assumed to be sufficient for the algorithm to determine whether a Send_To_Resource message has been received from the SCP with the ResourceType parameter set to 1.

Other tasks require some service-specific or subscriber-specific information for their resolution. These "knowledge intensive" tasks are numbered in FIG. 7 and are designated by heavy lines in the diagram. The resolution of these tasks requires some information about the specific services having simultaneous access to a given trigger, and/or about the subscriber's expectations about the overall behavior of the services when the trigger is encountered.

Referring to components in FIG. 7 outlined in bold, the knowledge-intensive tasks are enumerated as follows:

1. Determine if Simultaneous or Sequential or Single Query
2. Determine First SCP to Query (if sequential query)
3. Determine Subsequent Action (if sequential query)
4. Return Response to SSP (if sequential query)
5. Pass Information From SCP A To SCP B? (if sequential query)
6. Determine Information To Pass (if sequential query)
7. Determine Response To SSP (if simultaneous query)

Each of these tasks is explained in detail in the following subsections.

Task 1: Simultaneous. Sequential, or Single Ouery and Task 2: Determine First SCP At indicated by block 700, the MP receives a query message from the SSP. Upon receiving a query message from the SSP, the MP is assumed to identify the particular subscriber from which the query message originated, the trigger encountered, and the SCPs having simultaneous access to that trigger. Next, at decision block 702, the controlling algorithm must determine whether these SCPs are to be queried simultaneously, sequentially, or whether only one SCP will be queried. Sequential querying would be appropriate when the decision to invoke one service is dependent upon the results returned by a previously-invoked service, or when one service depends upon specific information generated by another service. Otherwise, it may be appropriate to query the services simultaneously. Moreover, the services may be incompatible, in which case only one service should be queried.

The Query Order and Default Rule for the two services having simultaneous access to a particular trigger (for some subscriber) are given in TABLE 2. The two services are arbitrarily labeled as Service A and Service B. Each is assumed to fall into one of the service categories defined in TABLE 1. For each specific pair of service categories, the Query Order given in the third column of TABLE 2 specifies whether the SCPs should be queried in sequential order, or whether the SCPs can be queried simultaneously, or whether the decision is subscriber dependent. In those cases when the choice is subscriber dependent, the fourth column of TABLE 2 provides a Default Rule to be used in specifying a choice in the absence of additional subscriber information. This additional information may be obtained during the third phase, the pre-provisioning analysis, during which a subscriber-dependent algorithm is verified or updated on the basis of this information.

TABLE 2

| Service A | Service B | Query Order | Default Rule |
|---|---|---|---|
| Screening | Screening | Sequential, Query A First, Then B | N/A |
| Screening | Routing (subscribed) | Subscriber Dependent | Sequential, Query A First, Then B |
| Screening | Logging (subscribed) | Subscriber Dependent | Sequential, Query A First, Then B |
| Screening | Data Display | Sequential, Query A First, Then B | N/A |
| Screening | Forwarding | Sequential, Query A First, Then B | N/A |
| Routing (subscribed or office-based) | Routing (same trigger) | Subscriber Dependent | Simultaneous |
| Routing (subscribed or office-based) | Logging (same trigger) | Subscriber Dependent | Sequential, Query A First, Then B |
| Logging (subscribed or office-based) | Logging (same trigger) | Simultaneous | N/A |
| Logging (subscribed) | Data Display | Simultaneous | N/A |
| Logging (subscribed) | Forwarding | Subscriber Dependent | Simultaneous |
| Data Display | Data Display | Simultaneous | N/A |
| Data Display | Forwarding | Subscriber Dependent | Query B Only |
| Forwarding | Forwarding | Subscriber Dependent | Simultaneous |

The decision to query the SCPs sequentially or simultaneously at decision block 702 satisfies Task 1 of the logic template. Task 2 (the identity of the SCP to be queried first) located at processing block 704, is also resolved by reference to TABLE 2. Query of the first SCP and receiving a response occur at processing block 706.

At decision block 708, it is determined if digit collection is required. If yes, at processing block 710, the Send_To_Resource parameter is returned to the SSP. Next, collection of digits and their return to the SCP occurs at block 712. A response will be received from the SCP at processing block 714.

Task 3: Determine Subsequent Action (Sequential Query)

If the controlling algorithm determined, in Task 1, that sequential querying of several SCPs is to occur, the algorithm must determine, in Task 3, what is to occur after a response is received from a SCP. There are two choices that can be made at this point: do not query another SCP but immediately return a response message to the SSP (processing block 718) or query another SCP (blocks 720 to 724). Appendix A lists the rule which specifies the subsequent action that should be taken if sequential querying was determined in Task 1 and a response from a SCP has just been received by the MP. TABLE A1, also located in Appendix A, summarizes the result of applying this rule for the various combinations of services that may have simultaneous access to a single trigger (for some subscriber).

Task 4: Return Response to SSP (Sequential Query)

When an algorithm based on the logic template of FIG. 7 reaches Task 4, response messages have been received from one or more SCPs, and it has been determined in Task 3 that a subsequent SCP does not have to be queried. A rule, which is listed in Appendix A specifies the single response message that the MP should provide to the SSP. TABLE A2, also in Appendix A, summarizes the results of applying this rule for various combinations of services residing on a SCP and having simultaneous access to a trigger (for some subscriber).

Task 5: Pass Information From SCP A to SCP B?

If at decision block 716, it is determined to query another SCP, then at decision block 720, it must be determined whether to pass information from SCP A to SCP B. The rule used to determine this is set forth in Appendix A.

Task 6: Determine Information to Pass

If information will be passed, then at processing block 722, it is necessary to determine information to pass from SCP A to SCP B and then proceed to send query to the next SCP at processing block 724. The information that needs to be passed from the first SCP to a second SCP typically includes CalledPartyID, CallingPartyID and Primary Carrier parameters. If information will not be passed, then processing block 722 will be bypassed, and the send query to next SCP at processing block 724 will occur. At this point, blocks 708 through 718 will be implemented.

Task 7: Determine Response to SSP (Simultaneous Query)

When an algorithm encounters processing block 726 in the controlling logic template, it has been determined (in Task 1 at decision block 702) that the SCPs should be queried simultaneously. Simultaneous queries will be sent to the SCP at processing block 726. The MP will receive multiple responses at block 728. The task to be resolved at processing block 730 is to determine a single response message from the MP to the SSP that combines the responses from the two SCPs. The response will be returned to the SSP at block 732.

Simultaneous queries may be applicable for the following service combinations:

1. Both SCP A and SCP B perform a routing service,
2. Both SCP A and SCP B perform a forwarding service,
3. At least one SCP performs a logging service,
4. Both SCP A and SCP B perform a data display service.

The following sections describe the rules for determining the MP's response to the SSP for each of the above combinations.

Two Routing Services—It is assumed that each routing service does one of the following: routes the call to another DN, routes the call to an alternative carrier, or does not route the call. There are then six cases to consider, as depicted in the TABLE 3.

TABLE 3

| SCP A | No Changes | SCP B Change Carrier | Change/Translate DN |
|---|---|---|---|
| No Changes | Case 1 | Case 2 | Case 3 |
| Change Carrier | — | Case 4 | Case 5 |
| Change/Translate DN | — | — | Case 6 |

For Case 1, since neither SCP is routing the call, the MP can return Analyze_Route to the SSP using the same parameter values as carried in the Analyze_Route message returned from either SCP.

For Case 2, the MP returns Analyze_Route to the SSP using the parameter values contained in the Analyze_Route message returned from the SCP that routes the call to an alternative carrier.

For Case 3, the MP returns Analyze_Route to the SSP using the value of CalledPartyID contained in the Analyze_Route message returned from the SCP that routes the call to a different DN.

For Case 4, the MP returns Analyze_Route to the SSP. But, because both SCPs are attempting to route the call to an alternative carrier, the call can only be routed to one of them. The criterion for selecting an alternative carrier is arbitrary. However, one option would be to route the call to the carrier designated by the appropriate parameter contained in the Analyze_Route message returned by most-recently-subscribed-to routing service.

For Case 5, the MP returns Analyze_Route to the SSP using the value of the carrier selection parameter returned by the SCP that is attempting to route the call to an alternative carrier, and using the value of the CalledPartyID parameter designated by the SCP that is attempting to route the call to a different DN.

For Case 6, the MP returns Analyze_Route to the SSP. But, because both SCPs are attempting to route the call to a different DN, the call can only be routed to one of them. The criterion for selecting the new CalledPartyID is arbitrary. However, one option would be to route the call to the CalledPartyID parameter contained in the Analyze_Route message returned by the most-recently-subscribed-to routing service.

Two Forwarding Services—Upon encountering a Termination_Attempt trigger on a subscriber's line for which two forwarding services are active, a forwarding service attempting to forward the call will return Forward_Call to the MP with a new value for the CalledPartyID, while a forwarding service that does not attempt to forward the call will return Authorize_Termination. There are then three cases to consider, as depicted in the TABLE 4.

TABLE 4

| SCP A | SCP B Authorize_Termination | SCP B Forward Call |
| --- | --- | --- |
| Authorize_Termination | Case 1 | Case 2 |
| Forward_Call | — | Case 3 |

For Case 1, since both SCPs are not attempting to forward the call, the MP returns Authorize_Termination to the SSP.

For Case 2, the MP returns Forward_Call to the SSP, using the parameter values contained in the Forward_Call message returned from the appropriate SCP.

For Case 3, because both SCPs are attempting to forward the call, the call can only be forwarded by one of them. The MP returns Forward_Call to the SSP, using a value of CalledPartyID contained in only one of the two Forward_Call messages received from the SCPs. The criterion for selecting the new CalledPartyID is arbitrary. However, one option would be to forward the call to the CalledPartyID designated by the most-recently-subscribed-to forwarding service.

At Least One Logging Service—If there is at least one logging service, return to the SSP the response message received from the service that does not perform the call logging function. If both SCPs provide a logging service, return the response message received from either one of them.

Two Data Display Services—A rule set forth in Appendix A is used to determine a single response message from the MP to the SSP when two data display services are simultaneously queried. One possible criteria to use in determining which parameter values to return, when the two SCPs return different values for the same parameter, is to use the values returned by the SCP having the service that was most recently subscribed to.

Phase 3—Pre-Provisioning Analysis

The third phase of the methodology for two SCPs having a single category service is called the pre-provisioning analysis phase. This phase typically take places prior to the actual deployment of a controlling algorithm at a MP (for some particular subscriber). This phase would only be necessary for updating subscriber-dependent algorithms to account for additional subscriber-specific information. The purpose of this phase is tQ obtain subscriber-specific information needed to resolve certain of the knowledge intensive tasks contained in subscriber-dependent algorithms. Subscriber-dependent, as previously discussed, means that its operation depends largely on how a subscriber who is a customer of this pair of third party services, might expect the services to work together when a multiply-subscribed trigger is encountered. In other words, a subscriber-dependent algorithm relies on the knowledge about subscriber expectation to function properly. Nevertheless, if this knowledge is unavailable, the methodology in the second phase offers default rules which embodies assumptions about how a subscriber wants a services pair to work. But this may or may not be what a subscriber really wants. As a result, pre-provisioning analysis is recommended for the subscriber-dependent algorithms. By doing so, default rules can be verified or replaced for a particular subscriber prior to deployment of the controlling logic.

TABLE 2 (Query Choice Rule) indicates when default rules may be necessary. When the query order is subscriber-dependent, a default rule specifies the most likely query ordering (i.e. that which reflects the most likely subscriber expectations). However, for each subscriber-dependent algorithm, there is (at most) only one other reasonable alternative rule for query ordering. Thus, modifying a subscriber-dependent algorithm to reflect additional subscriber information is equivalent to selecting either the default rule or an alternative rule for query ordering.

During pre-provisioning analysis, for a particular pair of third party services active at a multiply-subscribed trigger, determine whether or not the corresponding algorithm is subscriber-independent using TABLE 5 or subscriber-dependent using TABLE 6. If the algorithm is subscriber-independent, no further modification of the algorithm is needed. If the algorithm is subscriber-dependent, obtain subscriber expectations about services to allow selection of either the default rule or the alternative rule for determining query order. If the default rule is selected, use the existing algorithm as the basis of the controlling logic for that subscriber's trigger. If the alternative rule is selected, modify the algorithm so that the query ordering is based on the alternative rule,

TABLE 5

| Service A | Service B | Query Order |
| --- | --- | --- |
| Screening | Screening | Sequential, Query A First, Then B |
| Screening | Data Display | Sequential, Query A First, Then B |

TABLE 5-continued

| Service A | Service B | Query Order |
| --- | --- | --- |
| Screening | Forwarding | Sequential, Query A First, Then B |
| Routing | Data Display | Not Applicable |
| Routing | Forwarding | Not Applicable |
| Logging (subscribed or office-based) | Logging (same trigger) | Simultaneous |
| Logging (subscribed) | Data Display | Simultaneous |
| Data Display | Data Display | Simultaneous |

TABLE 6

| Service A | Service B | Default Rule | Alternative Rule |
| --- | --- | --- | --- |
| Screening | Routing (subscribed) | Sequential, Query A First, Then B | Sequential, Query B First, Then A |
| Screening | Logging (subscribed) | Sequential, Query A First, Then B | Simultaneous |
| Routing (subscribed or office-based) | Routing (same trigger) | Simultaneous | Either A or B |
| Routing (subscribed or office-based) | Logging (same trigger) | Sequential, Query A First, Then B | Simultaneous |
| Logging (subscribed) | Forwarding | Simultaneous | Sequential, Query B First, Then A |
| Data Display | Forwarding | Query B oniy | Query A only |
| Forwarding | Forwarding | Simultaneous | Either A or B |

To obtain subscriber expectation about how service should work together, questions are asked to the subscriber. TABLE 7 gives a sample list of questions that may help in acquiring this information from subscribers.

TABLE 7

| Service A | Service B | Questions to Ask |
| --- | --- | --- |
| Screening | Routing (subscribed) | Do you want to screen the call based on (1) dialed number or (2) final routed number? |
| Screening | Logging (subscribed) | Do you want to log (1) only the calls that actually are answered or go out or (2)all the incoming attempted calls? |
| Routing (subscribed or office-based) | Routing (same trigger) | Do you want to (1) use different routing services at different time or (2) just use one routing service? |
| Routing (subscribed or office-based) | Logging (same trigger) | Do you want to log (1) final routed number or (2) just dialed number? |
| Logging (subscribed) | Forwarding | Do you want to log (1) only the calling party number of (2) both calling and forwarded numbers? |
| Data Display | Forwarding | Do you want to select (1) Forwading and exclude Data Display or (2) Data Display and exclude Forwarding |
| Forwarding | Forwarding | Do you want to (1) use different forwarding services at different time or (2)just one forwarding service? |

II. Multiple Category Services—Two SCPs

Phase 1—Service Categories

A second illustrative embodiment of a methodology entails when a SCP may offer multiple category services. The first phase of the methodology is service classification. Given the service classification scheme developed previously, a set of ten multiple category services are set forth that are expected. These service categories can be defined as follows:

1. Screening+Logging Service: This is a screening service that also logs calls that pass/fail the screen.

2. Routing+Logging Service: This is a routing service that logs calls that are routed.

3. Screening+Routing Service: This service performs both a screening function and a routing function. There are three possible outcomes of this type of service namely, the call is rerouted, so that the service returns Analyze_Route with changed values of the CalledPartyID and/or Primary Carrier parameters, Call routing is unchanged by the service, and the call is disconnected. If the Call Routing is unchanged by the service, the service returns Analyze_Route, with no changes in the CalledPartyID or Primary Carrier parameter values. If the call is disconnected, the service returns Send_To_ Resource with the Disconnect flag set, or else returns Disconnect.

One possible interpretation of this type of service will depend upon which trigger it is provisioned on. For instance, if the service is provisioned on a subscribed trigger such as OHD and the screen fails, the call will not be routed, but the call may still be completed (to the Called Party Number originally dialed). Thus, the service may return Analyze_ Route to the MP, containing the CalledPartyID and Primary Carrier parameters that were originally carried in the Info_ Collected message sent to the SCP.

On the other hand, if the screening+routing service is provisioned on an office-based trigger such as 3/6/10 PODP, then the originally dialed digits will route the call to the SSP in which the office-based trigger is active. At that point, the dialed digits must be translated in order for the call to be completed to its intended destination. If the screening portion of the service fails, the routing portion of the service is not executed. In that case, the call cannot be completed, and is disconnected. If this happens, the service would return Send_To_Resource (with the Disconnect parameter set), Disconnect, or Continue.

4. Screening+Routing+Logging Service: This service performs similar to the screening+routing service, but it also logs all calls that satisfy some specified criteria.

5. Screening+Data Display Service: This service is like a screening service. If the incoming call passes the screen, then the call is terminated, and information about the call is displayed. If the incoming call fails the screen, then it is rejected.

6. Screening+Forwarding Service: This service performs both a screening function and a forwarding function. There are typically three possible outcomes of this type of service: a) The incoming call terminates normally on the called party's line. The screening+forwarding service returns Authorize_Termination. b) The incoming call does not complete to the called party, but is disconnected. The service returns either Send_To_Resource (with DisconnectFlag parameter set) or Disconnect. c) The incoming call is forwarded. The service returns Forward_Call.

7. Logging+Data Display Service: This service logs all incoming calls as well as displays data about the call.

8. Logging+Forwarding Service: This service forwards calls and also logs the forwarded calls.

9. Screening+Logging+Data Display Service: This service performs similar to the screening+data display service, with the additional capability that incoming calls are also logged.

10. Screening+Logging+Forwarding Service: This service performs similar to the screening+forwarding service, with the additional capability incoming calls are also logged according to some specified criteria.

Phase 2—Algorithmic Development

The second phase of the methodology is algorithmic development. The same logic template of FIG. 7 will be used for this illustrative embodiment. The remainder of this section is devoted to describing how the knowledge intensive tasks in the previous section can be extended to handle these multiple category services.

Task 1: Simultaneous Sequential, or Single Query and Task 2: Determine First SCP To resolve these two knowledge-intensive tasks when a multiple category service has access to a subscriber), the concept of a dominant service category is defined. The dominant service category is the single service category that will dominate the behavior of a multiple-category service when determining query order. The dominant service categories of the multiple-category services previously defined are shown in the second column of TABLE 8.

TABLE 8

| Combined Categories for a Multiple Category Service | Dominant Service Category |
| --- | --- |
| Screening + Routing | Routing |
| Screening + Logging | Screening |
| Routing + Logging | Routing |
| Screening + Routing +Logging | Routing |
| Screening + Data Display | Screening |
| Screening + Forwarding | Forwarding |
| Logging + Data Display | Data Display |
| Logging + Forwarding | Forwarding |
| Screening + Logging + Data Display | Screening |
| Screening + Logging + Forwarding | Forwarding |

With the notion of dominant service category, the same rules applied to the methodology for single category services at the knowledge intensive Tasks 1 and 2 can be applied to the methodology for multiple category services as well. To determine query order when either or both of the SCPs contain multiple category services, first determine the dominant service category of the multiple category service, using TABLE 8. Then use TABLE 2 to determine the appropriate query choice rule.

For example, when dealing with a screening service and a screening+routing service, apply the screening vs. routing rule in TABLE 2 to determine that the two SCPs should be queried sequentially, with the screening service queried first. Note that this query ordering is subscriber-dependent, just as in the case of a single category screening service and routing service.

Task 3: Determine Subsequent Action (Sequential Query)

When either single category or multiple category services are deployed at a SCP, the rule in Appendix B specifies the subsequent action that should be taken if sequential querying was determined in Task 1 and a response from a SCP has just been received by the MP. TABLE B1, located in Appendix B summarizes the result of applying this rule for the various combinations of single category and multiple category services that may have simultaneous access to a single trigger (for some subscriber).

Task 4: Return Response to SSP (Sequential Query)

Using the results obtained for the resolution of this task for the methodology of single category services, the rule listed in Appendix B specifies the response message the MP will return to the SSP when either single category or multiple category services reside at a SCP. TABLE B2, located in Appendix B summarizes the result of applying this rule for the various combinations of single category and multiple category services that may have simultaneous access to a single trigger (for some subscriber).

Task 5: Pass Information From SCP A to SCP B?

The general rule for the single category services still applies to multiple category services if it is assumed that the functions performed by the service is equivalent to its dominant service category. This rule is set forth in Appendix B.

Task 6: Determine Information to Pass

The information that needs to be passed is exactly the same as that for the single category services, i.e. pass CalledPartyID, CallingPartyID, and Primary Carrier parameters from the first SCP to the second SCP.

Task 7: Determine Response to SSP (Simultaneous Query)

The rules developed for single category services still apply if it is assumed that the function performed by each multiple category service is equivalent to its dominant category.

Simultaneous queries will be applicable for the following service combinations:

1. Both SCP A and SCP B perform a routing function.
2. Both SCP A and SCP B perform a forwarding function.
3. At least one SCP performs a logging function.
4. Both SCP A and SCP B perform a data display function.

The same rules that applied for single service category as set forth above apply except that there are two additional rules for two routing services as listed in Appendix B.

Phase 3—Pre-Provisioning Analysis

The third phase of the methodology is pre-provisioning analysis. The same pre-provisioning analysis described for the methodology for single category services can be used. TABLE 7, previously discussed can be applied to multiple category services by simply treating each service as the dominant categories in TABLE 8.

One final regard concerning the methodology for single category services and the methodology for multiple category services. It assumed that the MP performs a certain amount of processing upon receiving a query message from the SSP, and that the results of this processing is made available as input to any controlling algorithm deployed. These results include the identification of the trigger encountered and query message received, identification of the subscriber associated with the trigger encountered, and the identification of the service providers able to provide services to the subscriber at the trigger encountered. Therefore, the methodology does not include a procedure for determining this information.

III. Multiple SCPs Having A Single Category Service

The third illustrative embodiment of a methodology handles any number of SCPs with each SCP supporting a single service category. The methodology can be used to generate the controlling logic for a set of subscribed services on a trigger. This controlling logic is provisioned on a per-subscriber basis because each subscriber may choose a different set of services, or the same set of services but with different expectations about the behaviors of those services.

The methodology is based on the idea that a controlling logic is implied by four things, namely: (1) the service categories present at the SCPs; (2) the way in which those services should behave together; (3) the way in which the SCPs are queried; (4) and a logic template that specifies the processing tasks that must be done so that a given query ordering results in a given services behavior.

Figure 8:
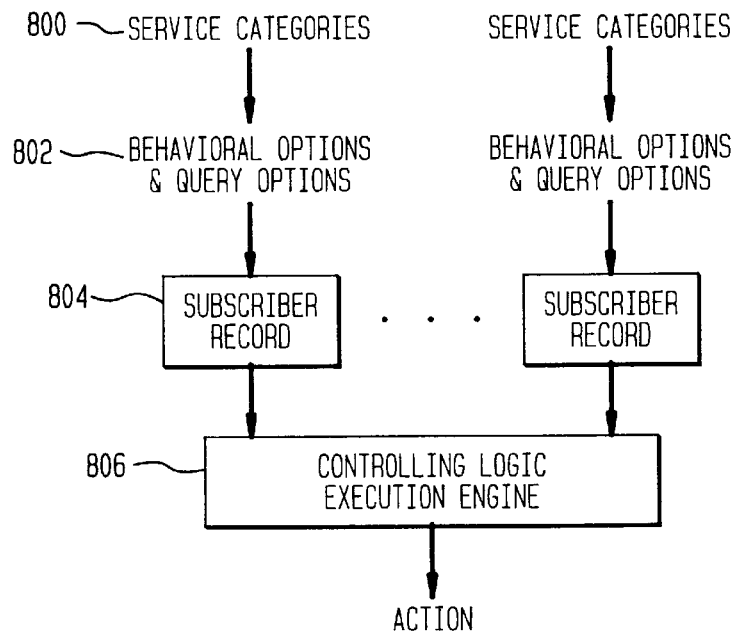
FIG. 8 illustrates the overall relationship between the different components of an illustrative embodiment of the methodology of the present invention.

FIG. 8 illustrates the overall relationship between the different components of the methodology. Behavioral options and query options in processing block 802 are dependent upon the service categories located in processing block labeled 800 that are invoked when a trigger is encountered. These behavioral options and query options are then implemented within a subscriber record 804 accessible to the MP.

When a trigger is encountered and the SSP sends a query message to the MP, the MP retrieves the subscriber record 804 in order to determine how the services are to jointly behave, and in what manner the SCPs are to be queried. This information, together with the logic template and the associated task rules, is all that is required (with the possible exception of additional conflict resolution criteria in certain cases) to specify the interactions among the MP, the various SCPs, and the SSP so that the services will behave as desired. The processing box 806 in FIG. 8 labeled Controlling Logic Execution Engine embodies the logic template and the task rules, and together with the information in the subscriber record 804, may be termed the controlling logic.

Phase 1—Triggers and Service Categories

The first phase of the methodology is to identify triggers which may be multiply-subscribed, and the service categories present at SCPs having simultaneous access to these triggers. The same triggers for the methodologies previously discussed can be utilized. Services present at each SCP which are invoked by these triggers are assumed to belong to a common set of service categories.

Based on the available triggers, the types of services that may be provided at SCPs and made available to subscribers can be classified into six categories: Screening services, Number Translation services, Carrier Selection services, Call logging services, Data display services, and Forwarding services. The service categories were previously discussed.

There is an association of triggers and service categories. TABLE 9 associates each of the triggers with the corresponding categories of service that may be invoked by that trigger. Also included in the table are the TDPs at which the trigger is encountered, and the messages which the SCP would be expected to return in response to the associated query message. As illustrated in TABLE 9, each service category is associated with some (but not necessarily all) of the triggers. For instance, a number translation service is associated only with OHD, PODP FC, 3/6/10 PODP, and N11 triggers, while a forwarding service is associated only with TAT trigger.

TABLE 9

| Trigger | TDP | Service Categories | Response Msg |
|---|---|---|---|
| OHD (Subscribed) | Information Collected | Carrier Selection, Number Translation Logging | Analyze_Route |
| | | — | — |
| | | Screening | Analyze_Route Send_To_Resource, Disconnect |
| PODP FC (Subscribed) | Information Analyzed | Carrier Selection, Number Translation | Analyze_Route |
| | | Screening | Analyze_Route Continue †, Send_To_Resource Disconnect |
| | | — | — |
| | | Logging | Analyze_Route Continue † |
| 3/6/10 PODP (Office-based) | Information Analyzed | Carrier Selection, Number Translation | Analyze_Route |
| | | — | — |
| | | Screening | Analyze_Route Continue †, Send_To_Resource, Disconnect |
| | | — | — |
| | | Logging | Analyze_Route, Continue † |
| N11 (Office-based) | Information Analyzed | Number Translation Carrier Selection | Analyze_Route |
| | | — | — |
| | | Screening | Analyze_Route Continue †, Send_To_Resource, Disconnect |
| | | — | — |
| | | Logging | Analyze_Route, Continue † |
| TAT (Subscribed) | Termination Attempt | Forwarding | Forward_Call, Authorize_Termination |
| | | — | — |
| | | Data Display | Authorize_Termination |
| | | — | — |
| | | Screening | Authorize_Termination Send_To_Resource, Disconnect |
| | | — | — |
| | | Logging | Authorize_Termination |

† Note that Continue message is valid only for triggers associated with Information Analyzed TDP.

Phase 2—Pre-Provisioning Analysis

Pre-provisioning analysis contains the heart of the methodology, and must be carried out before the controlling logic can actually be implemented on a MP. Pre-provisioning analysis describes how a set of behavioral and query options may be generated for some set of service categories having simultaneous access to a trigger (one service category per SCP). Once these behavioral and query options have been defined, a selection mechanism may be used for the selection of a specific behavioral and query option.

Method for Generating Behavioral Options

The first phase of the pre-provisioning analysis is the generation of behavioral options. In order to specify a controlling logic for some set of service categories operating at the same trigger, a behavioral option must be chosen. In general, a behavioral option is defined by the behavioral relationship between each pair of services in the set. The complexity of a behavioral option generally increases as the number of SCPs increases. A behavioral option refers to the joint behavior of the services operating at different SCPs, as perceived by a subscriber, when the associated trigger is encountered. For example, a screening service operating at one SCP may screen outgoing calls based upon a DN generated by a number translation service operating at a different SCP, or instead may screen calls using only dialed information. Calls passing the screen would then being rerouted using information generated by the number translation service. A methodology for generating candidate behavioral options for a given set of service categories is presented as follows.

Generation of Candidate Behavioral Options

Determination of a set of behavioral options begins by specifying the number of SCPs which will have simultaneous access to some trigger, and then identifying the service category present at each SCP. For a given set of service categories, enumerate all possible pairs of these service categories. For each such pair, one or more behavioral relations may be defined between members of the pair. Each behavioral relation represents one possible way in which the two service categories may affect each other's behavior. In general, the behavioral relations which can be defined between each pair of service categories will depend on the definition of the service categories themselves.

A behavioral option represents the observed behavior of the services when they are jointly invoked by the same trigger. Therefore, a behavioral option consists of a specific set of behavioral relations for each pair of service categories making up the set. Candidate behavioral options for the given set of service categories are constructed by forming all possible combinations of behavioral relations for all pairs of service categories. The total number of candidate behavioral options is thus equal to the total number of possible combinations of behavioral relations across all the pairs. For example, for three SCPs and three different service categories A, B, and C, assume that there is one possible behavioral relation between A and B, two relations between B and C, and three relations between A and C. Therefore, there would be 1×2×3=6 candidate behavioral options.

Determine Behavioral Relations Between Pairs

For each pair of service categories resident at a different SCP having simultaneous access to a trigger, the following behavioral relations are defined:
Notation:Meaning
A→B: The behavior of B depends on information generated by A.

A|B: A and B act independently and do not affect each other's behavior.
A!B: A may disable B by disconnecting the call.
A#B: A is incompatible with B (i.e., A and B attempt to influence call processing in mutually exclusive ways).

For each pair of service categories that may coexist at the same trigger, TABLE 10 shows the behavioral relations which are possible.

TABLE 10

| Pair | Behavioral Relations | |
| --- | --- | --- |
| Number Translation and Carrier Selection | NT→CS | |
| Number Translation and Logging | NT→L | NT\|L |
| Carrier Selection and Logging | CS→L | CS\|L |
| Screening and Number Translation | NT→S | S! NT |
| Screening and Carrier Selection | CS→S | S! CS |
| Screening and Logging | S! L | S\|L |
| Forwarding and Data Display | F#DD | |
| Screening and Forwarding | S!F | F→S |
| Screening and Data Display | S!DD | |
| Forwarding and Logging | F→L | F\|L |
| Data Display and Logging | DD→L | DD\|L |
| X and X, where X is Number Translation OR Carrier Selection OR Forwarding | X # X | |
| Y and Y, where Y is Logging OR Data Display | Y\|Y | |
| Screening and Screening | S(1) !S(2) OR S(2) !S(1) OR {S(1) !S(2) and S(2) !S(l)} | |

Given a set of candidate behavioral options, some may represent inconsistent behaviors because of circular behavioral dependencies among certain pairs of service categories. Identifying which candidate behavioral options are inconsistent will be detected in the determination of their associated query options. It is also possible that an "incompatible" behavioral relation exists between a pair of service categories. If this is the case, the two services cannot jointly affect call processing. It is suggested that when incompatible services exist at different SCPs, the conflict be resolved before proceeding to determine query options. The net result may be that one of the SCPs containing an incompatible service is eliminated from further consideration; i.e., the number of active SCPs is reduced by one and no incompatible services exists in the new set. This is described further during the discussion of Conflict Resolution Criteria.

Example Behavioral Option

The method of constructing behavioral options is illustrated by providing an example. In this example, generate candidate behavioral options for the case in which three SCPs contain the following service categories: screening, number translation, and carrier selection.

First, generate all pairwise combinations of service categories among the three in this set, and associate with each pair all possible behavioral relations (from the above table). This results are set forth in TABLE 11.

TABLE 11

| Service Pair | Behavioral Relations | |
| --- | --- | --- |
| Number Translation and Carrier Selection | NT→CS | |
| Screening and Number Translation | NT→S | S! NT |
| Screening and Carrier Selection | CS→S | S! CS |

Forming all combinations of behavioral relations for each pair of service categories, there are nine possible behavioral options and they are set forth in TABLE 12.

TABLE 12

| Behavioral Option | Behavioral Relations | | |
|---|---|---|---|
| 1 | NT→CS | NT→S | CS→S |
| 2 | NT→CS | NT→S | S! CS |
| 3 | NT→CS | S! NT | CS→S |
| 4 | NT→CS | S! NT | S! CS |

Write each behavioral option by listing each of the behavioral relations between braces.

For example, behavioral option 4 may be written as {NT→CS, S! NT, S!CS}.

Method for Generating Query Options

How to generate a set of potential behavioral options for a given set of service categories active on the same trigger was previously described. These are "potential" behavioral options because it is possible that, due to the behavioral relations defined between each pair of service categories, the overall result is a contradictory behavior among the services. In the next step of the methodology, identifying and discarding of those potential behavioral options having contradictory behaviors occurs. Once this is done, IT can be guaranteed that one or more query options exist for the remaining "true" behavioral options. It turns out that the way to identify contradictory behavioral options also leads directly to the generation of query options for the remaining behavioral options.

This next phase of pre-provisioning analysis is generating query options for a given behavioral option. Query options refer to decisions about how the various SCPs are to be queried. Query options are associated with specific behavioral options. For each behavioral option chosen, there may be more than one query option.

In general, when there are two SCPs, query options are limited to two alternatives: simultaneous or sequential querying. As with behavioral options, query options become more complex as the number of SCPs increase. For example, given three SCPs X, Y, and Z, suppose the particular behavioral option chosen may require that the service at Y depends on information produced by the service at X. One query option might therefore be to query X first, wait for a response, then query Y and Z simultaneously (with the output of X as input to Y only). Another query option would be to query X and Z simultaneously, and then query Y using information generated by X. Yet another query option would be to query all three SCPs in sequential order: X first, then Y, then Z. While all three options could produce the same overall services behavior, the differences between these options is reflected in the amount of processing overhead required at the MP to manage the queries and responses. In other words, a given behavioral option and an associated query option together specify a controlling logic.

The first step in this process is to translate each behavioral relation making up a potential behavioral option into one or more precedence relations. Each precedence relation specifies a particular ordering in which the two SCPs associated with each pair of service categories can be queried and still maintain the pairwise behavioral relation between the services. If any potential behavioral option contains incompatible behavioral relations, then this behavioral option must be modified so that one of the incompatible service categories is excluded. This is accomplished during the conflict resolution criteria phase. Here it is simply assumed that no query options can be generated until the incompatible conflict is resolved (e.g., by selecting only one SCP to query while ignoring the other).

In addition, if a behavioral relation is independent, no corresponding precedence relation exists because the SCPs can be queried in any order. Therefore, precedence relations only need to be specified for the remaining two behavioral relations. The precedence relations for these two behavioral relations are defined in TABLE 13.

TABLE 13

| Behavioral Relation | Precedence Relation |
|---|---|
| A affects the behavior of B (A→B) | A<B |
| A may disable B by disconnecting the call (A ! B) | A<B OR<br>X<A<Y and X<B<Y |

Figure 9:
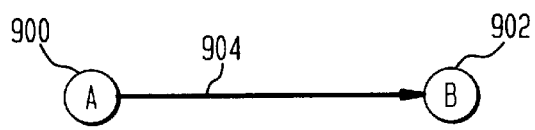
FIG. 9 shows the graphical representation of the precedence relation A<B.

The precedence relation A<B is interpreted as "A precedes B"; that is, SCP A is queried before SCP B. This is depicted graphically in FIG. 9. Node 900 (which contains A) is connected to node 902 (which contains B) by a unidirectional link 904.

Figure 10:
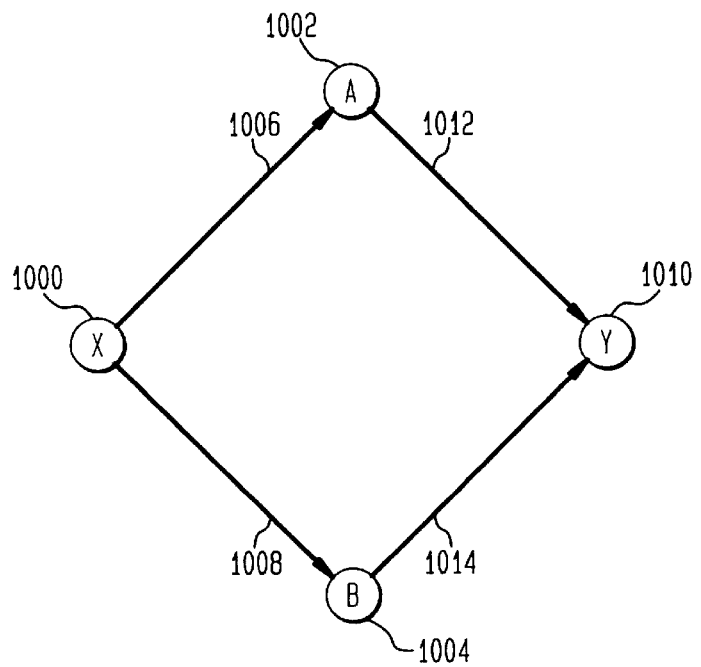
FIG. 10 shows the graphical representation of the precedence relation X<A<Y and X<B<Y.

The precedence relation "X<A<Y and X<B<Y" is interpreted as "A and B are queried simultaneously". The dummy variables X and Y may be interpreted as representing point in call processing. This is depicted graphically in FIG. 10. Node 1000 (which contains X) connects to node 1002 (which contains A) and node 1004 (which contains B) via unidirectional links 1006 and 1008 respectively. Node 1002 and node 1004 each connect to node 1010 (which contains Y) via unidirectional links 1012 and 1014, respectively.

As indicated in the TABLE 13 above, there are two possible precedence relations for the behavioral relation A!B. Intuitively, this means that when A can disable B, A must be a screening service, and A can disable B in two ways. In one way, A is queried first (A<B). If the screen fails, the call is ended, but if the screen passes, B is queried next. This is represented by the precedence relation A<B. Alternately, A and B can be queried simultaneously (X<A<Y and X<B<Y). After responses have been received from both A and B, the responses must be compared. If the screening service at A fails, then the controlling logic returns "fail" to the SSP. If the screen passes, the response received from B is allowed to affect call processing. Therefore, the dummy variable X represents the point in the controlling logic just prior to the simultaneous query, while the dummy variable Y represents the point in the controlling logic after responses have been received from A and B.

Once these precedence relations have been defined for each potential behavioral option, a potential behavioral option can be represented graphically in terms of the precedence relations between the service categories.

Examples of Using Precedence Relations to Represent Behavioral Options

Two examples of using these precedence relations to represent behavioral options are given below. As an example, consider the behavioral option represented as {NT→S, CS→S, NT→CS}. This corresponds to the precedence ordering {NT<CS, CS<S, NT<S}, and is graphically depicted in FIG. 11. Node 1100 (containing NT) connects to CS located in node 1102 via unidirectional link 1104. Node 1100 also connects to node 1106 (containing S) via unidirectional link 1108. Node 1102 (containing CS) connects to node 1106 (containing S) as well via unidirectional link 1110.

For a more complex example, the number translation (NT), carrier selection (CS), and screening (S) service categories are active at the same trigger. Consider the behavioral option {NT→CS, S!CS, NT→S}. That is, the behavior of a carrier selection service depends on the behavior of a number translation service, and a screening service can disable the carrier selection service (and end the call) if the screen fails. The precedence relations that correspond to the three behavioral relations defined in this behavioral option are NT<CS; NT<S; S<CS OR X<S<Y and X<CS<Y.

Because there are two ways to represent the behavioral option S!CS, two precedence orderings are required to represent this particular behavioral option: {NT<CS, S<CS, NT<S} and {NT<CS, NT<S, X<S<Y, X<CS<Y}.

Figure 12:
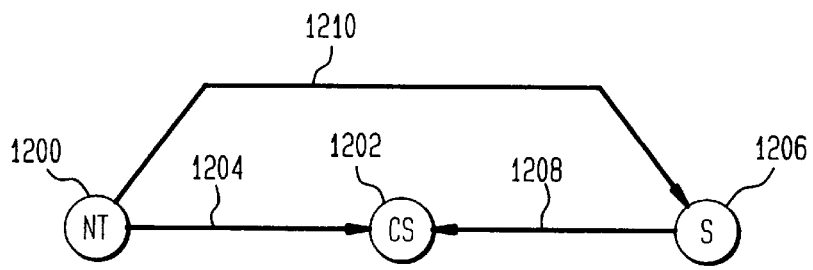
FIG. 12 shows a graphical representation of the precedence ordering {NT<CS, S<CS, NT<S}.
Figure 13:
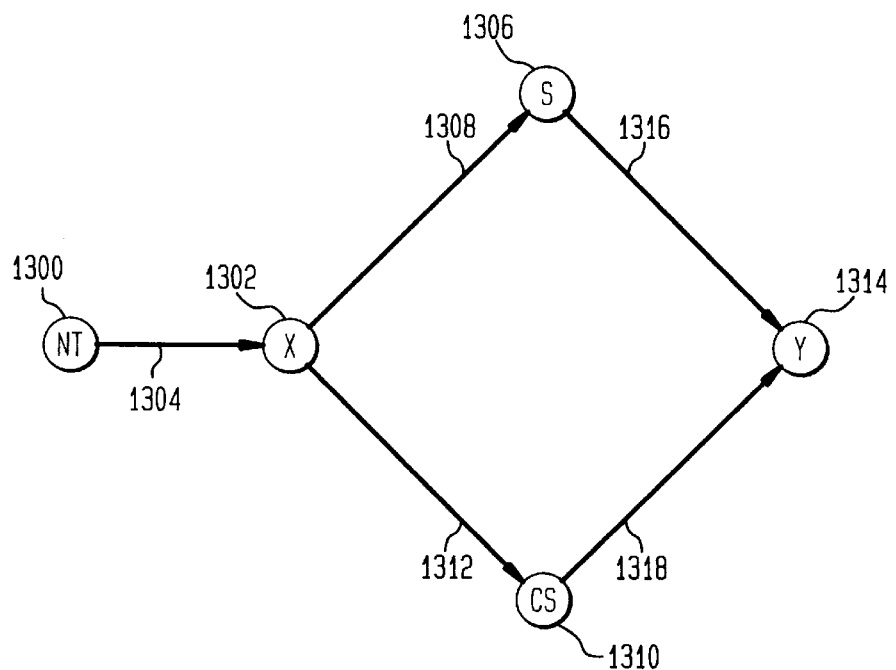
FIG. 13 shows a graphical representation of the precedence ordering {NT<CS, X<S<Y, X<CS<Y}.

These two precedence orderings can then be depicted in FIG. 12 and FIG. 13. With reference to FIG. 12, the node 1200 (containing NT) connects to the node 1202 (containing CS) via unidirectional link 1204. The node 1206 (containing S) connects to node 1202 (containing CS) via unidirectional link 1208. The node 1200 (containing NT) connects to node 1206 (containing S) via unidirectional link 1210. With reference to FIG. 13, the node 1300 (containing NT) connects to the node 1302 (containing X) via unidirectional link 1304. The node 1302 (containing X) connects to node 1306 (containing S) via unidirectional link 1308 and also to node 1310 (containing CS) via link 1312. Both nodes 1306 and 1310 connect to node 1314 (containing Y) via links 1316 and 1318 respectively.

Note that in FIG. 13, NT is depicted as preceding X instead of directly preceding CS, even though the precedence ordering between NT and CS is NT<CS and no precedence ordering is defined above between NT and X. The reason for this is that the dummy variable X should be interpreted as the "entrance" to either S or CS, while the dummy variable Y should be interpreted as the "exit" from either S or CS. Thus, for example, if there were an additional precedence relation S<Z for some other service Z, the arrow would be drawn from Y to Z rather than from S to Z.

Once the precedence relations are depicted graphically, the next step is to determine whether the precedence relations for a potential behavioral option form a partial ordering. If they do form a partial ordering, the potential behavioral option is valid (i.e., no inconsistencies) and therefore one or more query options exist. If they do not form a partial ordering, the potential behavioral option is not valid. No query options or controlling logic then exists.

In formal terms, a partial ordering of a set S is a relation between objects of the set, which may be denoted by the symbol "<" (precedes), satisfying the following properties for any objects x, y, z in S:

If x<y and y<z, then x<z (Transitivity)

If x<y then y\<x (Asymmetry)

x\<x (Irreflexivity)

(The symbol \< means "does not precede")

However, it can be determined whether a partial ordering among the precedence relations exists by a purely graphical approach. To do this, observe the graph corresponding to the precedence relations which represent a potential behavioral option, and see if a directed cycle (i.e., a closed loop with arrows in the same direction) exists. If a directed cycle can be found, a partial ordering does not exist. If no directed cycle exists, then the precedence relations forms a partial ordering. If a partial ordering exists, then the potential behavioral option contains no inconsistencies, and hence one or more query options can be found. If a partial ordering does not exist, the potential behavioral option is invalid.

For example, FIG. 14 is a graph which is not a partial ordering. In this graph, there are two directed cycles: a to b to d to a, and a to c to d to a. Node 1400 (containing a) connects to node 1402 (containing b) via unidirectional link 1404 and also to node 1406 (containing c) via unidirectional link 1408. Both nodes 1402 and 1406 connect to node 1410 (containing d) via unidirectional links 1412 and 1414 respectively. Node 1410 also connects to node 1400 via unidirectional link 1416.

Figure 11:
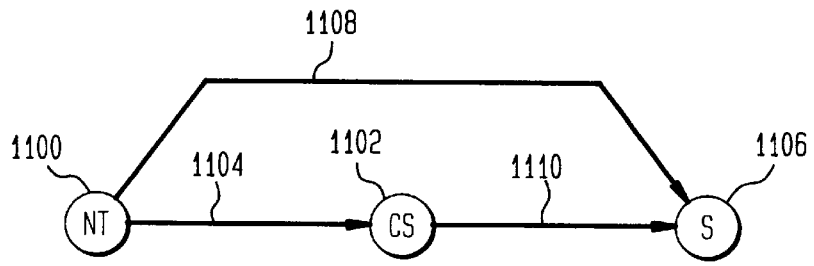
FIG. 11 shows a graphical representation of the precedence ordering{NT<CS, CS<S, NT<S}.

Using this rule, the potential behavioral option depicted in FIG. 11 forms a partial ordering, and hence corresponds to a true behavioral ordering having one or more query options. Likewise, the potential behavioral option represented by FIG. 12 and FIG. 13 is also a true behavioral option, since no directed cycles exist between any of the nodes. In this example, because the behavioral relation S!CS can be represented by two precedence relations, both of the graphs must be checked for directed cycles.

The next step is to use these results to actually generate the query options.

Generation of Query Options

Once a behavioral option has been represented in the form of the directed graphs, and no directed cycles have been found, the generation of query options is straightforward. TABLE 14 is used to generate query options according to the following procedure.

1. Begin by observing the directed graph(s) corresponding to each behavioral option, and identify those nodes which have no antecedents. That is, determine which nodes (i.e., service categories) do not have arrows coming into them. List those service categories under "Iteration 1".

2. Cross off those nodes identified in the previous step, and cross off all the arrows which emanate from those nodes. There will now be a new set of nodes which have no incoming arrows.

3. Repeat the procedure by listing in the table, for Iteration 2, the new set of nodes having no antecedents. Cross off these nodes and the arrows which emanate from them.

4. Repeat this procedure until all nodes in the graph are eliminated.

When this procedure is completed, the table will contain a set of service categories for as many iterations as is needed to eliminate all the nodes. All the SCPs corresponding to the service categories identified in iteration 1 may then be queried simultaneously. Following this, the SCPs corresponding to the service categories identified in iteration 2 may be queried simultaneously, and so on.

TABLE 14

| Iteration | Service Categories |
|---|---|
| 1 | |
| 2 | |
| 3 | |

For example, TABLE 15 shows the TABLE 14 filled in after three example iterations:

TABLE 15

| Iteration | Service Categories |
|---|---|
| 1 | A |
| 2 | B C D |
| 3 | E |

Then the corresponding query option is A<(B, C, D)<E, where (B, C, D) indicates that SCPs B, C, and D are to be queried simultaneously.

The following observations can be made about the method just described.

The number of query options generated will be equal to the number of directed graphs generated for each behavioral option. So, for example, when a screening service is present and screening can disable one of the other services (S!X), at least two directed graphs will be generated because there exist two precedence orderings which correspond to this behavioral relation (as shown above). Therefore, at least two query options will exist.

Because dummy variables are needed to represent the precedence relations corresponding to the behavioral relation S ! X (i.e., screening disables service X), the dummy variables are treated as any other node in the graph when this procedure is applied. However, after TABLE 14 is completed and the service categories are listed for each iteration, the dummy variables are simply discarded when forming the query option corresponding to the table entries.

If two or more SCPs are present and the services they contain are all (X|Y) according to some behavioral option, no precedence relations exist. The graph that corresponds to this case would consist of circles drawn for each service category, with no arrows drawn between them. Applying the procedure outlined above, the SCPs listed under iteration 1 occur. This means that the corresponding query option for this case is that all the SCPs are queried simultaneously; e.g., (X, Y, Z).

When a behavioral option indicates that all the service categories are independent, it could also be argued that the SCPs could be queried sequentially; e.g., X<Y<Z, Z<Y<X, etc. Query options such as these are not identified by this methodology because an underlying assumption of this method is that simultaneous queries are preferable whenever possible.

Illustrative Example

The following illustrates the generation of query options for the two behavioral options {CS→S, NT→S, NT→CS} and {NT→CS, S!CS, NT→S}. FIG. 11 depicts the precedence relations corresponding to the first behavioral option. Applying the procedure described above, TABLE 16 is derived.

TABLE 16

| Iteration | Service Categories |
|---|---|
| 1 | NT |
| 2 | CS |
| 3 | S |

The corresponding query option is NT<CS<S.

For the behavioral option {NT→CS, S!CS, NT→S}, there are two precedence relations, as illustrated in FIG. 12 and FIG. 13. Therefore, two query options will be generated. TABLE 17 is the table derived by applying the procedure to FIG. 12.

TABLE 17

| Iteration | Service Categories |
|---|---|
| 1 | NT |
| 2 | S |
| 3 | CS |

The corresponding query option is NT<S<CS.

TABLE 18 is derived by applying the procedure to FIG. 13.

TABLE 18

| Iteration | Service Categories |
|---|---|
| 1 | NT |
| 2 | X |
| 3 | S, CS |
| 4 | Y |

Since X and Y are dummy variables, these are discarded and the following query option: NT<(S, CS) is formed.

Selection of a Query Option

While a particular behavioral option and query option together imply a controlling logic, there will usually be several query options available for a given behavioral option. Some method needs to be specified so that an optimal query option can be selected. Because a query option implies a specific controlling logic, without a selection mechanism there is no rational basis for preferring one controlling logic over another for the support of some desired services behavior. Because query options become more complex as the number of SCPs increases, this becomes increasingly important for three and more SCPs.

Once a set of query options has been generated for a given behavioral option, the problem then becomes one of choosing a query option for use in a controlling algorithm. In order to do this, a way of rating each candidate query option on the basis of some set of criteria which reflect the overall goodness of each option is developed. The set of candidate query options can then be ranked from best to worst on the basis of these ratings. While the selection of a query option for the case in which only two SCPs are queried may not require an elaborate rating mechanism, because only two query options generally will exist, for a greater number of SCPs it may not be obvious which query option may offer the biggest advantage.

One possible rating scheme discussed here is based on the criteria efficiency (E), cost (C), and performance (P). The Score S is defined to be equal to a weighted sum of these three factors which pertain to query options:

$$Score = E*weight(E) - C*weight(C) + P*weight(P)$$

High scores correspond to better query options, while low scores correspond to worse query options.

The three scoring factors E, C, and P have the following properties:

E is high if the number of potentially unnecessary queries is small.
E is low if the number of potentially unnecessary queries is high.
C is high if the complexity of the controlling logic associated with each query option is high.
C is low if the complexity of the controlling logic associated with each query option is low.
P is high if the response time is fast.
P is low if the response time is slow.

The descriptors high, low, fast, and small are by definition highly subjective.

In the above definition of E, a potentially unnecessary query to some SCP is one that may not result in any affect on call processing. It can be defined more formally by saying that a query to a SCP with service X is potentially unnecessary if:

a SCP having a screening service is queried simultaneously with another SCP containing X, and the behavioral relation between screening and X is that screening acts to disable X (S!X).

The reason why the query to X is potentially unnecessary is because X will have no affect on call processing if the screen fails.

P is related to the response time. One way to further evaluate response time is to determine how many simultaneous queries exist in a query option under evaluation. A simultaneous query could always have been performed as a number of sequential queries. But, since a simultaneous query of three SCPs, say, takes place in only one step, whereas a sequential query of three SCPs takes place in three steps, simultaneous queries in general will be faster than the corresponding sequential queries.

In order to define the C factor, first breakdown any given query option into the following four steps:
1. Query n SCPs
2. Await response(s)
3. Process responses
4. Stop (and return result to SSP) OR Go To (1)

A given query option may cycle through these steps one or more times. Each such cycle generates some cost. Next then associate the cost of a query option with the complexity of the query encountered on each cycle. On each cycle, the query performed can be categorized as follows (in order of decreasing complexity):

A. Simultaneous query of screening service and one or more services at other SCPs, when screening can disable one of the other services (i.e., S!X).
B. Sequential query in which the first SCP must pass information to the second SCP, or where the service at the first SCP queried can disable a service at the next SCP to be queried.
C. Other simultaneous queries.
D. Other sequential queries.

Using this definition, a C for each query option may be assigned by the following two-step procedure:
1. For each cycle, assign a normalized value based on the complexity breakdown, as indicated in the table below.
2. Sum the normalized values over all the cycles in the query option.

The previously described methodology can now be quantified by assigning values to each of the factors making up the selection score, as indicated in TABLE 19.

TABLE 19

| Factor | Action | Value |
|---|---|---|
| Efficiency | No unnecessary queries | 1 |
|  | One or more potentially unnecessary queries | 0 |
| Performance | Simultaneous Query | 1 |
|  | Sequential Query | 0 |
| Cost | Simultaneous query of screening service and one or more services at other SCPs, when screening can disable one of the other services (i.e., S ! X) | 0.5 |
| Cost | Sequential query in which the first SCP must pass information to the second SCP, or where the service at the first SCP queried can disable a service at the next SCP to be queried. | 0.3 |
|  | Other simultaneous queries | 0.2 |
|  | Other sequential queries | 0.1 |

The values assigned to the actions associated with each factor are arbitrary.
However, an important constraint is that the values associated with each factor sum to one.
These values can now be applied to obtain an overall score for the query option. The overall score can be written as $$\text{Score} = [\text{weight}(E)\Sigma(\text{efficiency values})] - [\text{weight}(C)*\Sigma(\text{cost values})] + [\text{weight}(P)*\Sigma(\text{performance values})]$$

where the summation is over all the cycles contained in the query option, and where weight (E)+weight (C)+weight (P)=1.

Subscriber Record

Once the behavior option and query option are generated, they are implemented within a subscriber record accessible to the MP. When a trigger is encountered and the SSP sends a message to the MP, the MP retrieves the subscriber record in order to determine how the services are to jointly behave and what manner the SCPs are to be queried. FIG. 15 shows one illustrative embodiment of a subscriber record. When the MP looks at the subscriber record, it will see a subscriber id 1500, trigger id 1502 (which identifies the trigger), and two service categories, service category A 1506 and service category B 1510 associated with the trigger id 1502. Service category A 1506 is associated with a service provider A 1504 and service category B 1510 is associated with service provider B 1508. The behavior option 1512 and its associated query option 1514 are also part of the subscriber record and are used as an input to the logic template to specify the controlling logic.

Phase 3—Controlling Logic

The next phase entails specifying a controlling logic for the management of communications between an SSP and several SCPs (via a MP), when a multiply-subscribed trigger is encountered. The controlling logic will form the basis of management capabilities that must be deployed at an MP to support simultaneous access.

Given the categories of the services present at the SCPs having simultaneous access to a particular trigger, as well as the behavioral option and query option representing the services behavior located in the subscriber record, a controlling logic can be generated. This controlling logic completely determines how the MP responds to the information it receives from the SCPs that are queried, as well as how the MP should respond to the SSP with a single response message for subsequent call processing. Each controlling logic is based on a common logic template which defines the tasks that must be performed by the controlling logic, and the relationship between those tasks.

FIG. 16 illustrates the common logic template that will serve as the basis for defining a controlling logic for managing communications between the SSP and several SCPs (via the MP) when these SCPs have simultaneous access to a particular trigger (for some subscriber). This logic flow is illustrated in terms of tasks that must be performed at the MP, together with the relationship between these tasks. A controlling logic will be specific to the information located in the subscriber record (i.e. the service categories having simultaneous access to the subscriber's trigger and the service behavior and query ordering desired). The controlling logic will be executed at the MP when the MP receives a query message from the SSP indicating that a multiply-subscribed trigger has been encountered.

Some of these tasks indicated in the logic template are generic in the sense that they do not depend upon any service-specific or subscriber-specific knowledge. For instance, one of the tasks shown is a decision point in which it must be determined whether additional digit collection is required. To resolve this, it is assumed sufficient to simply determine whether a Send_To_Resource message has been received from the SCP with the ResourceType parameter set to 1.

Other tasks require some additional knowledge or information for their resolution. These "knowledge intensive" tasks are numbered in FIG. 16 and are designated by bold lines in the diagram. The resolution of these tasks requires some information about the specific services having simultaneous access to a given trigger, and/or about the service's joint behavior to be maintained when the trigger is encountered.

The template shows that first step to be to receive a query from the SSP at processing block 1600. After that, at processing block 1602, the selection of a behavioral option and query option (i.e., the task labeled as 1) occurs. At processing block 1604, the Next Query Operation must be determined. A query operation refers to the query that must be performed at this point in the logic flow. There are two alternatives, namely, either a single SCP is to be queried, or several SCPs are to be queried simultaneously.

Referring to components in FIG. 16 outlined in bold, the knowledge-intensive tasks are enumerated as follows:

1. Select Behavioral Option, Query Option
2. Collect Digits and Return to Appropriate SCP
3. Query Additional SCPs?
4. Determine Information to Pass in Next Query Operation
5. Determine Response To SSP Task 1: Select Behavioral Option, Query Option Referring to FIG. 16, upon receiving a query message from the SSP at processing block 1600, the MP identifies the particular subscriber from which the query message originated, the trigger encountered, and the service providers having simultaneous access to that trigger using the subscriber record. The subscriber record also identifies the particular behavioral option and query option that will be applicable at processing block 1602.

The next step in the template is a decision block 1604, labeled Next Query Operation?. At this point, either a single SCP may be queried and a response received as in processing block 1606, or several SCPs may be queried simultaneously as shown in processing block 1608. The choice of whether to query a single SCP or several SCPs is specified by the query option located in the subscriber record.

For ease of explanation, each query option is composed of one or more "cycles". Each cycle simply specifies the SCPs that will be queried at a single point in time. For instance, for the query option W<X, there are two cycles, since W and X are queried at two separate points in time. For the query option W<(X, Y)<Z there are three cycles, with two SCPs queried simultaneously in the second cycle.

The SCPs in the current cycle are then queried, and the controlling logic awaits responses from each of the SCPs. After the responses have been received, the next step in the logic flow at decision block 1610, "Digit Collection Required?". One or more of the services queried may request further information be provided in the form of additional digits collected from the subscriber. This is indicated by the responses received from the SCPs. Normally, such a request can only be made by a screening service, and that the information is necessary so that the screening service can ultimately return a response indicating either "pass" or "fail".

Task 2: Collect Digits and Return to Appropriate SCP

If digit collection is requested at decision block 1610, the logic flow moves to blocks 1612 through 1616. If additional information is required, the controlling logic is assumed to return a Send_To_Resource message to the SSP with the ResourceType parameter set to 1, indicating that an announcement should be played and digits collected. If only one SCP is queried on the current cycle, and this SCP is requesting further information, then the MP returns the collected digits to the SCP that was last queried. If two or more SCPs were simultaneously queried on this cycle and one (or more) is requesting additional information, then the controlling logic must direct the SSP to collect the information, while at the same time recording the responses received from the other SCPs. When the collected digits are returned to the MP, the controlling logic must direct the MP to send the information to the requesting SCP. At processing block 1612, Send_To_Resource is returned to the SSP. Next at processing block 1614, collection of digits occurs and the return to the appropriate SCP and finally at processing block 1616, a response will be received from the appropriate SCP.

If no digit collection is required on this cycle at decision block 1610, the logic flow moves to Task 3 (Query Additional SCPs?)at decision block 1618.

Task 3: Query Additional SCPs?

Depending upon the responses received from the SCPs that were queried in the current cycle, the controlling logic must determine whether any additional SCPs must be queried. This is done at the decision block 1618 of the controlling logic labeled Task 3 (Query Another SCP?). The knowledge necessary to determine whether additional SCPs are to be queried depends upon the query option and the current cycle. The rule set forth in Appendix C and is applied to determine whether any additional SCPs are to be queried.

Task 4: Determine Information to Pass in Next Query Operation

Determining whether information needs to be passed in the Next Query Operation at processing block 1624 depends upon the behavioral option and the query option, according to a rule set forth in Appendix C. After this is accomplished, the logic flow returns to processing block 1604.

Task 5: Determine Response to SSP

When this task is encountered in the logic flow, no additional SCPs are to be queried, and the MP must formulate a reply to the SSP at processing block 1620. Determination of the response message to the SSP depends upon whether the trigger encountered is an originating trigger or a terminating trigger. The response message may then be determined using the rule for originating triggers and terminating triggers set forth in Appendix C. Once the response is determined, the response is returned to the SSP at processing block 1622.

Phase 4—Conflict Resolution Criteria

An optional phase of the methodology is conflict resolution criteria. Conflict resolution criteria are necessary when two or more SCPs contain services which may conflict with each other (i.e., they attempt to influence call processing in a contradictory manner). Conflicts occur when two or more SCPs containing number translation services, carrier selection services, forwarding services, or (possibly) data display service may be invoked by the same trigger encounter. These services are conflicting because each may attempt to return different values for the same piece of information (e.g., CalledPartyID) needed for subsequent call processing. Since only one such value can be returned to the SSP for call processing, some criteria is needed to resolve the conflict that would be caused if both services are activated. The particular criteria chosen would be reflected in the query option defined, and may also affect the controlling logic associated with that query option.

In general, one illustrative approach is based on the notion that the SCPs having simultaneous access to a particular trigger all contain services which are compatible with each other. If, however, the behavioral relations between some pair of service categories indicates that the services are incompatible, then both of them cannot simultaneously influence call processing. For example, two number translation services active on the same trigger are incompatible, because only a single CalledPartyID can affect call processing. When incompatible services are active on the same trigger, the procedures and methodology described in this document will not generate query options, and therefore, a controlling logic.

To resolve such conflicts, the services active on any particular trigger for a given subscriber are identified in a subscriber record. With this in mind, there are several approaches to dealing with incompatible service categories. When a forwarding service and a data display service are both available at the same trigger, the behavioral option can designate which is to affect the call. In other situations, it is assumed that a choice is made during the pre-provisioning analysis about which of the conflicting SCPs should be queried. The subscriber record then identifies only this SCP. When the MP receives a query message from the SSP and consults the subscriber record to identify the SCPs (and service categories) active on the trigger, it will only know about the one that has previously been selected. The controlling logic, therefore, does not need to perform any additional processing in order to select an SCP or resolve conflicting parameter values returned from simultaneously queried SCP.

A different kind of conflict resolution criteria are needed when several data display services exist at SCPs active on the same trigger. In that case, the data display services are only in conflict if different services return different values for the same parameter. All these SCPs to be queried because each may return a different piece of information for display. Although a data display service does not affect call processing, only one value for a given parameter can be displayed on a display device. Therefore, when the same parameter is assigned different values by different data display services, the conflict among these values must be resolved in the controlling logic. If conflict resolution criteria are not provided, the controlling logic must assume some default, such as not displaying any value for conflicting parameters.

Appendix D demonstrates the application of the methodology for determining behavioral options and query options when two SCPs have simultaneous access to the same trigger.

IV. Unifying Principles

The foregoing Sections I, II, and III have presented details of, respectively; (I) a single service category per SCP for a two-SCP system; (II) multiple service categories per SCP for a two-SCP system; and (III) a single category of service per SCP for a two or more SCP system. In each case, underlying the methodology is a pre-provisioning analysis phase completed before the system is actually deployed in an operational system. In that phase, an expert in SSP-SCP service provisioning and feature interactions, acting as a mentor, determines control options for each trigger indicative of service categories by capturing service interaction principles supplied by the services expert. In Sections (I) and (II), the system mentor completes an additional step not present in Section (III), namely, system defaults are substituted for customer decisions. In Section (III), each customer is offered options from the available control options, and the customer chooses from among the available control options so as to meet the expectations of the customer when the service is executed. In this later case, the selected control option controls execution of each of the service nodes, that is, SCP nodes, and each corresponding one of the service categories for the particular trigger with reference to the control options.

One skilled in the art may recognize that the general terms service origination node and serving node can be used for a query/reply transaction rather than SSP and SCPs or SCPs. In addition, by way of expanding the breadth of the disclosure, control options will include both behavioral options and query options.

It is to be further understood that the various illustrative embodiments of the methodology described herein is not limited to the specific forms shown by way of illustration, but may assume other embodiments limited only by the scope of the appended claims.

Appendix A

/* Task 3: Determine Subsequent Action (Sequential Query)
The following rule specifies the subsequent action that should be taken if sequential querying was determined in Task 1 and a response from a SCP has just been received by the MP. */

```
RULE BEGIN
IF
{two SCPs have already been queried}
THEN
{do not query another SCP}
ELSE IF
{the first SCP queried is a screening service AND either
Send_To_Resource or Disconnect is returned {after any digit
collection) }
THEN
{do not query another SCP}
ELSE IF
{the first SCP queried, as well as the remaining SCP, both contain routing
services OR forwarding services }
THEN
{do not query another SCP}
ELSE IF;
{the first SCP queried contains a forwarding service AND the remaining
SCP contains a data display service }
THEN
{do not query another SCP }
ELSE IF
{the first SCP queried contains a data display service AND the remaining
SCP contains a forwarding service}
THEN
{do not query another SCP}
ELSE
{query the remaining SCP}
RULE END
```

TABLE A1 summarizes the result of applying this rule for the various combinations of services that may have simultaneous access to a single trigger (for some subscriber). Because this task is encountered in a controlling algorithm only if the SCPs are to be queried sequentially (or if only one is to be queried), the first column of TABLE A1 indicates which SCP was queried first. The second column identifies a possible response message that was received from this SCP, and the third column indicates the service provided by the remaining SCP to be queried. The fourth column contains the subsequent MP action.

TABLE A1

Subsequent MP Action - After First Sequential Query

| SCP Service Queried First | Final Response Received From First SCP | Remaining SCP Service | Subsequent Action |
|---|---|---|---|
| Screening | Analyze_Route Authorize_Termination | (Any) | Query Remaining SCP |
| Screening | Send_To_Resource, Disconnect | (Any) | Do Not Query Another SCP |
| Routing | Analyze_Route | Logging, Screening | Query Remaining SCP |
| Routing | Analyze_Route | Routing | Do Not Query Another SCP |
| Fowarding | Foward_Call, Authorize_Termination | Forward-ing or Data Display | Do Not Query Another SCP |
| Forwarding | Forward_Call, Authorize_Termination | Logging | Query Remaining SCP |
| Data Display | Authorize_Termination | Forward-ing | Do Not Query SCP |

/* Task 4: Return Response to SSP (Sequential Query)

The following rule specifies the single response message that the MP should provide to the SSP. */

```
RULE BEGIN
IF
{only one SCP was queried}
THEN
{return to the SSP the response message received from the SCP that was queried}
ELSE IF
{one of the SCPs queried contains a screening service; AND this service returns either Send_To_Resource or Disconnect (after any digit collection) }
THEN
{return to the SSP the response message received from this SCP}
ELSE IF
{one of the SCPs queried contains a routing service OR a data display service OR a forwarding service }
THEN
{return to the SSP the response message received from the SCP containing this service}
ELSE
{return to the SSP the response message received from the second SCP queried}
RULE END
```

TABLE A2 below summarizes the result of applying this rule for the various combinations of services residing on a SCP and having simultaneous access to trigger for some subscriber).

TABLE A2

Response Returned to SSP (Sequential)

| First SCP Queried | Second SCP Queried | Return Response From: |
|---|---|---|
| Screening | None -Screening Failed | First SCP |
| Screening | Screening | Second SCP |
| Screenng | Routing | Second SCP |
| Screening | Logging | Second SCP |
| Screening | Data Display | Second SCP |
| Screening | Forwarding | Second SCP |
| Routing | None | First SCP |
| Routing | Logging | First SCP |
| Routing | Screening (Pass) - Analyze Route | First SCP |
| Routing | Screening (Fail) - Send_To_Resource - Disconnect | Second SCP |
| Forwarding | Logging | First SCP |
| Forwarding | None | First SCP |
| Data Display | None | First SCP |

/* Task 5: Pass Information From SCP A to SCP B?

The following general rule is used to determine whether information must be passed from one SCP to another SCP */

```
RULE BEGIN
IF
{
(first SCP queried provides a routing service OR a forwarding service)
AND
(second SCP queried provides a logging service OR a screening service)
}
THEN
(pass information from first SCP to second SCP)
RULE END
/*Task 7: Determine Response to SSP - When Two Data Display Services Are Simultaneously Queried */
RULE BEGIN
IF
{the values of all corresponding parameters returned in the Authorize_Termination messages received from both SCPs are the same }
THEN
{Return Authorize_Termination to the SSP with parameter values set equal to the common values returned from both SCPs }
ELSE IF
{the values of any of the corresponding parameters returned in the Authorize_Termination messages received from both SCPs are different}
THEN
{Return Authorize_Termination to the SSP with parameter values set equal to the common values returned from both SCPs for those parameters whose returned values are the same, AND set parameter values equal to that returned from only one of the SCPs, as determined by some specified criteria, for those parameters for which the two SCPs returned different values}
RULE END
```

Appendix B

/* Task 3: Determine Subsequent Action (Sequential Query) for Multiple Category Services This rule specifies the subsequent action that should be taken if sequential querying was determined in Task 1 and a response from a SCP has just been received by the MP. Note that the rule below is identical to that described in the methodology for single category services except that each service category is now treated as a function rather than a service. For example, a screening service in the methodology is called a screening function here. */

```
RULE BEGIN
IF
{two SCPs have already been queried}
THEN
{do not query another SCP}
ELSE IF
{the first SCP queried contains a screening function AND either Send_To_Resource or Disconnect is returned (after any digit collection)}
THEN
{do not query another SCP
ELSE IF
{the first SCP queried, as well as the remaining SCP, both contain routing
```

-continued

```
functions OR forwarding functions }
THEN
{do not query another SCP}
ELSE IF
{the first SCP queried contains a forwarding function AND the remaining
SCP contains a data display function}
THEN
{do not query another SCP}
ELSE IF
{the first SCP queried contains a data display function AND the remaining
SCP contains a forwarding function}
THEN
{do not query another SCP}
ELSE
{query the remaining SCP}
RULE END
```

TABLE B1 summarizes the result of applying this rule for the various combinations of single category and multiple category services that may have simultaneous access to a single trigger (for some subscriber).

TABLE B1

Subsequent MP Action - After First Sequential Query
(Single/Multiple Category Services)

| SCP Service Queried First | Response Received From First SCP | Remaining SCP | Subsequent Action |
|---|---|---|---|
| Screening OR Screening + Logging OR Screening + Logging + Data Display | Analyze_Route, Authorize_Termination | (Any) | Query Remaining SCP |
| Screening OR Screening + Logging OR Screening + Logging + Data Display | Send_To_Resouce, Disconnect | (Any) | Do Not Query Another SCP |
| Routing OR Screening + Routing OR Routing + Logging OR Screening + Routing + Logging | Analyze_Route | Logging OR Screening OR Screening + Logging | Query Remaining SCP |
| Routing OR Screening + Routing OR Routing + Logging OR Screening + Routing + Logging | Analyze_Route | Routing OR Screening + Routing OR Routing + Logging OR Screening + Routing + Logging | Do not Query Another SCP |
| Screening + Routing OR Screening + Routing + Logging | Send_To_Resource, Disconnect | (Any) | Do Not Query Another SCP |
| Forwarding OR Screening + Forwarding OR Logging + Forwarding OR Screening + Logging + Forwarding | Forward_Call, Authorize_Termination | Forwarding OR Screening + Forwarding OR Logging + Forwarding OR Screening + Logging + Forwarding OR Data Display OR Logging + Data Display | Do Not Query Another SCP |
| Forwarding OR Screening + Forwarding OR Logging + Forwarding OR Screening + Logging + Forwarding | Forward_Call Authorize_Termination | Logging | Query Remaining SCP |
| Screening + Forwarding OR Screening + Logging + Forwarding | Send_To_Resource, Disconnect | (Any) | Do Not Query Another SCP |
| Data Display OR Logging + Data Display | Authorize_Termination | Forwarding OR Screening + Forwarding OR Logging + Forwarding OR Screening + Logging + Forwarding | Do Not Query Another SCP |

/* Task 4: Return Response to SSP (Sequential Query) */

The rule specifies the response message the MP will return to the SSP when either single category or multiple category services reside at a SCP. Note that in addition to treating each service category as a function rather than a service, the rule below also extends the rule for methodology having single category services to accommodate multiple category services. The extensions to the original rule are shown in italics.

```
RULE BEGIN
IF
{only one CP was queried}
THEN
{return to the SSP the response message received from the SCP that was
queried}
ELSE IF
{one of the SCPs queried contains a service having a screening function,
AND this service returns either Send_To_Resource or Disconnect
(after any digit collection) }
THEN
{return to the SSP the response message received from this SCP}
ELSE IF
{both SCPs queried contain a data display function}
THEN
{apply the rule contained in /* Task 7: Determine Response to SSP -
When Two Data Display Services Are Simultaneously Queried */
located in Appendix A to determine the MP's response to the SSP}
ELSE IF
{one of the SCPs queried contains a data display function, and the other
SCP queried contains a forwarding function}
THEN
{return to the SSP the response message received from the SCP having the
service with the forwarding function}
ELSE IF
{either of the SCPs queried contains a routing function OR a data display
function OR a forwarding function}
THEN
{return to the SSP the response message received from the SCP containing
the service with this function }
ELSE
{return to the SSP the response message received from the second SCP
queried}
RULE END
```

TABLE B2 summarizes the result of applying this rule for the various combinations of single category and multiple category services that may have simultaneous access to a single trigger (for some subscriber).

TABLE B2

Response Returned to SSP
(Sequential)(Multiple Category Services)

| First SCP Queried | Second SCP Queried | Return Response From: |
|---|---|---|
| Screening OR Screening +Logging OR Screening + Data Display OR Screening + Logging + Data Display | None - Screeing Failed | First SCP |
| Screening OR Screening + Logging | Screening OR Screening + Logging | Second SCP |
| Screening + Data Display OR Screening + Logging + Data Display | Screening + Data Display OR Screening + Logging + Data Display | IF both SCP's return Authorize_Termination THEN response returned is the same as described in /* Task 7: Determine Response to SSP */ located in Appendix A ELSE IF second SCP returns Send_To_Resourse or Disconnect THEN return response from Second SCP. |
| Screening OR Screening + Logging | Routing OR Screening + Routing OR Routing + Logging OR Screening + Routing + Logging | Second SCP |
| Screening OR Screening + Logging | Logging | Second SCP |
| Screening + Data Display OR Screening + Logging + Data Display | Logging | First SCP |
| Screening OR Screening + Logging | Data Display OR Logging + Data Display | Second SCP |
| Screening + Data Display OR Screening + Logging + Data Display | Data Display OR Logging + Data Display | Response returned is same as described in /* Task 7: Determine Response to SSP */ located in Appendix A. |
| Screening OR Screening + Logging OR Screening + Data Display OR Screening + Logging + Data Display | Forwarding OR Screening + Fowarding OR Screening + Logging + Forwarding OR Screening + Logging + Forwarding | Second SCP |
| Routing OR Screening + Routing OR Routing + Logging OR Screening + Routing + Logging | None | First SCP |
| Routing OR Screening + Routing OR Routing + Logging OR Screening + Routing + Logging | Logging | First SCP |
| Routing OR Screening + Routing OR Routing + Logging OR Screening + Routing + Logging | Screening OR Screening +Logging (Pass Screen) -Analyze Route | First SCP |

TABLE B2-continued

Response Returned to SSP
(Sequential)(Multiple Category Services)

| First SCP Queried | Second SCP Queried | Return Response From: |
|---|---|---|
| Routing OR Screening + Routing OR Routing + Logging OR Screening + Routing + Logging | Screening OR Screening + Logging (Fail Screen) -Send_To_Resource -Disconnect | Second SCP |
| Forwarding OR Screening + Forwarding OR Logging + Forwarding OR Screening + Logging + Forwarding | Logging | First SCP |
| Forwarding OR Screening + Forwarding OR Logging + Forwarding OR Screening + Logging + Forwarding | None | First SCP |
| Data Display OR Logging + Data Display | None | First SCP |

/* Task 5: Pass Information From SCP A to SCP B? (Multiple Service Category) The following general rule is used to determine whether information must be passed from one SCP to another SCP. The general rule for methodology for the single category services still applies to multiple category services if it is assumed that the function performed by the service is equivalent to its dominant service category. */

RULE BEGIN
IF
{
(first SCP queried provides a routing function OR a forwarding function)
AND
(second SCP queried provides a logging function OR a screening function)
}
THEN
(pass information from first SCP to second SCP)
RULE END
/* Task 7: Determine Response to SSP - When Two Routing Services */
RULE 1 BEGIN
IF {
{
(one of the routing services (screening + routing OR screening + routing + logging) attempts to disconnect the call by returning $Send_{13}$ $To_{13}$ Resource (with DisconnectFlag set), or Disconnect)
AND
(the other routing service does not disconnect the call)
}
THEN
the MP returns to the SSP the response received from the routing service that does not disconnect the call.
}
RULE 1 END
RULE 2 BEGIN
IF
both of the routing services (screening + routing or screening + routing + logging) attempt to disconnect the call by returning $Send_{13}$ $To_{13}$ Resource (with DisconnectFlag set), or
Disconnect
THEN
the MP returns $Send_{13}$ $To_{13}$ Resource (With DisconnectFlag set) to the SSP
RULE 2 END

Appendix C

```
/* Task 3: Query Additional SCPs */
```
a. If the current cycle is equal to the number of cycles in the query option, then no further SCPs are to be queried.

b. If the current cycle is less than the number of cycles in the query option and the current cycle does not contain a screening service, then additional SCPs are to be queried.

c. If the current cycle is less than the number of cycles in the query option and the current cycle contains a screening service and the result of the screening service is "pass", then additional SCPs are to be queried.

d. If the current cycle is less than the number of cycles in the query option and the current cycle contains a screening service and the result of the screening service is "fail", then no further SCPs are to be queried. If no further SCPs are to be queried, then the logic flow moves to Task 5 (Determine Response to SCP)at processing block 1620 and a response is returned to the SSP at processing block 1622. If additional SCPs are to be queried, the logic flow moves to Task 4 (Determine Information to Pass . . . ) at processing block 1624.

```
/* Task 4: Determine Information to Pass in Next Query Operation
```
Determining whether information needs to be passed from any of the SCPs queried in the current cycle to any of the SCPs to be queried on the next cycle depends upon the behavioral option and the query option, according to a rule set forth below. */ a. If the behavioral option does not contain any behavioral relations of the type A→B (e.g., the behavior of B depends on information generated by A), then no information needs to be passed to an SCP queried on the next cycle.

b. If the behavioral option does contain one or more behavioral relations of the type A→B, and if service category A was queried on the current cycle and service category B is to be queried on the next cycle, as specified in the query option, then information must be passed from A to B, as follows:

In the query message to B, all parameters common to both this query message and the response message returned from A will have the same values as were returned from A.

After Task 4 is completed, the logic flow moves back to the point labeled "Next Query Operation?", as indicated in FIG. 16, and one or more additional SCPs are queried on a new cycle.

```
/* Task 5: Determine Response to SSP */
```

---

For Originating Triggers
IF
{any screening service that was queried returned "fail", then the MP will return "fail" to the SSP. This is usually indicated by a response message of
Send_To_Resource with a DisconnectFlag parameter set and ResourceType parameter set to 0 (play announcement), or with a Disconnect message. }
OTHERWISE
{If a number translation service and a carrier selection services were both queried, then the MP will return the response obtained from the carrier selection service. }
OTHERWISE
{If either a number translation service or a carrier selection service was queried, but not both, then the MP will return the response from the service that was queried. }
OTHERWISE
{If neither a number translation service nor a carrier selection service was queried, but one or more logging services were queried, then the MP will return the response from any of the logging services.}

-continued

OTHERWISE
{The MP will return the response from any of the screening services that were queried. }
For Terminating Triggers
IF
{Any screening service that was queried returned "fail", then the MP will return "fail" to the SSP. This is usually indicated by a response message of
Send_T_Resource with a DisconnectFlag parameter set and ResourceType parameter set to 0 (play announcement), or with a Disconnect message.}
OTHERWISE
{If a forwarding service was queried, the MP will return the response received from that service.}
OTHERWISE
{If two or more data display services were queried, the MP will return Authorize_Termination message containing the common value of those parameters which had the same value returned by each data display service, and the single value, as determined by the conflict resolution criteria, of those parameters which did not have the same value returned by each data display service. }
OTHERWISE
{If a single data display service was queried, the MP will return the response from that service.}
OTHERWISE
{The MP will return the response from any of the services what were queried.}

Appendix D: Two SCPs Per Trigger

This Appendix demonstrates the application of the methodology described in this document for determining behavioral options and query options when two SCPs have simultaneous access to the same trigger. First, the case in which the SCPs contain services belonging to different categories is examined. Then, the case in which the service categories are the same is addressed.

D.1 Different Service Categories At Each SCP

A controlling logic must be specified for a particular combination of service categories resident at the SCPs having simultaneous access to a multiply-subscribed trigger. However, only certain combinations of service categories may feasibly exist at the same trigger. Therefore, first identify those service categories that may be invoked by each trigger. Then form pairwise combinations of those service categories. The feasible combinations of service categories for each trigger are given in Section D.1.1.

In most cases, two behavioral options are listed for each pair of service categories. However, for some pairs of service categories (e.g., number translation and carrier selection), there is only a single behavioral option, since it is assumed that a carrier selection service may depend upon the number to which the call is directed (e.g., the result of a number translation service). The choice of the particular behavioral option therefore reflects overall behavior of the two services as experienced by the subscriber.

There are two logically distinct query options. One option is to simultaneously query the two SCPs whenever possible. Another option is to query the two SCPs sequentially, thereby minimizing the number of potentially "unnecessary" queries (i.e., queries that will have no affect on the call). However, this option is only meaningful when one of the services belongs to the screening category, because the pass/fail outcome of such a service will determine whether another service should be invoked.

D.1.1 Service Combinations

The following tables summarize, for each trigger, the feasible combinations of service categories resident at the two SCPs. The two SCPs are arbitrarily labelled SCP A and SCP B. The tables present the service categories that may feasibly exist at SCP B, given the particular service category present at SCP A.

TABLE D-1

| OHD | |
|---|---|
| SCP A | SCP B |
| Number Translation | Carrier Selection, Screening, Logging |
| Carrier Selection | Screening, Logging |
| Screening | Logging |

The OFD trigger is assumed to support all logical combinations of service categories appropriate to an originating trigger.

TABLE D-2

| PODP FC | |
|---|---|
| SCP A | SCP B |
| Number Translation | Cariier Selection, Screening, Logging |

The PODP FC trigger must aways have a Number Translation service at one of the SCPs having access to this trigger. Otherwise, a *XY feature code could not be translated into a directory number for call completion.

TABLE D-3

| 3/6/10 PODP | |
|---|---|
| SCP A | SCP B |
| Number Translation | Carrier Selection, Screening, Logging |
| Carrier Selection | Screening, Logging |

The 3/6/10 PODP trigger must always have a Number Translation or Carrier Selection service (or both) at an SCP having access to the trigger. In other words, it is not reasonable for a service performing only a screening and/or logging function to be invoked using this trigger. This assumption is based on the fact that because this trigger is office-based, all calls in the office meeting the trigger criteria would result in a query to the SCP, even those not subscribing to the screening and/or logging service.

TABLE D-4

| N11 | |
|---|---|
| SCP A | SCP B |
| Number Translation | Carrier Selectjon, Screening, Logging |

N11 trigger must always have a Number Translation service at one of the SCPs having access to this trigger. Otherwise, a N11 code cannot be translated into a DN for call completion.

TABLE D-5

| TAT | |
|---|---|
| SCP A | SCP B |
| Forwarding | Screening, Logging, Data Display |
| Data Display | Screening, Logging |
| Screening | Logging |

The TAT trigger is assumed to support all logical combinations of service categories appropriate to an terminating trigger.

D.1.2 Behavioral and Query Options

Behavioral options and query options for each different pair of service categories are defined as follows.

D.1.2.1 Number Translation, Carrier Selection

SCP Categories: Number Translation (NT), Carrier Selection (CS)

Triggers: OHD, PODP FC, 3/6/10 PODP, N11

| | Query Option |
|---|---|
| Behavioral Option | Number Translation <Carrier Selection |
| Carrier Selection may be based on DN | |

D.1.2.2 Number Translation, Screening

SCP Categories: Number Translation (NT), Screening(S)

Triggers: OHD, PODP FC, 3/6/10 PODP, N11

| | Query Option |
|---|---|
| Behavioral Option A Screen outgoing call using translated number | Number Translation <Screening |
| Behavioral Option B Re-route call using translated number only if pass Screen, else end call | Screening <Number Translation (Number Translation, Screening) |

D.1.2.3 Carrier Selection, Screening

SCP Categories: Carrier Selection (CS), Screening (S)

Triggers: OHD, 3/6/10 PODP

| | Query Option |
|---|---|
| Behavioral Option A Screen outgoing call using new carrier ID | Carrier Selection < Screening |
| Behavioral Option B Re-route call via another carrier only if pass Screen, else end call | Screening < Carrier Selection (Carrier Selection, Screening) |

D.1.2.4 Screening, Logging

SCP Categories: Screening(S), Logging (L)

Triggers: OHD, TAT

| | Query Option |
|---|---|
| Behavioral Option A<br>Log only those incoming/outgoing calls that pass Screen, end call if screen fails | Screening < Logging |
| Behavioral Option B<br>Log all incoming/outgoing calls regardless of Screen | (Logging, Screening) |

D.1.2.5 Number Translation, Logging

SCP Categories: Number Translation (NT), Logging (L)

Triggers: OHD, PODP FC, 3/6/10 PODP, N11

| | Query Option |
|---|---|
| Behavioral Option A<br>Redirect call using translated number and log call using the translated number | Number Translation < Logging |
| Behavioral Option B<br>Redirect call using translated number and log call using the original, untranslated dialed digits | (Logging, Number Translation) |

D.1.2.6 Carrier Selection, Logging

SCP Categories: Carrier Selection (CS), Logging (L)

Triggers: OHD, 3/6/10 PODP

| | Query Option |
|---|---|
| Behaviorai Option A<br>Redirect call using new carrier ID and log cail using the new carrier ID | Carrier Selection < Logging |
| Behaviorai Option B<br>Redirect call using new carrier D and Log call using the default carrier ID | (Logging, Carrier Selection) |

D.1.2.7 Data Display, Longing

SCP Categories: Data Display (DD), Logging (L)

Triggers: TAT

| | Query Option |
|---|---|
| Behavioral Option<br>Log incoming call and also display call data | (Data Display, Logging) |

D.1.2.8 Forwarding, Logging

SCP Categories: Forwarding(F), Logging (L)

Triggers: TAT

| | Query Option |
|---|---|
| Behavioral Option A<br>Log the forwarded call | Forwarding < Logging |
| Behavioral Option B<br>Forward the call but log information about the incoming call only | (Logging, Forwarding) |

D.1.2.9 Forwarding, Data Display

SCP Categories: Forwarding(F), Data Display (DD)

Triggers: TAT

| | Query Option |
|---|---|
| Behavioral Option A<br>Forward the call | Forwarding Only |
| Behavioral Option B<br>Present the incoming call and display information about the call | Data Display Only |

D.1.2.10 Forwarding, Screening

SCP Categories: Forwarding(F), Screening (S)

Triggers: TAT

| | Query Option |
|---|---|
| Behavioral Option A<br>Forward the call if pass Screen, else end the call | Screen < Forwarding<br>(Screen, Forwarding) |
| Behavioral Option B<br>Screen the forwarded call only | Forwarding < Screen |

D.1.2.11 Data Display, Screening

SCP Categories: Data Display(DD), Screening (S)

Triggers: TAT

| | Query Option |
|---|---|
| Behavioral Option<br>Display incoming call information for all calls passing Screen; Else end call | Screen < Data Display<br>(Screen, Data Display) |

D.2 Same Service Category at Each SCP

When each of the two SCPs contain services belonging to the same category, three different situations exist. These are:
two Screening services,
two Logging services,
two Data Display services,

D.2.1 Two Screening Services

Both screening services must pass in order to continue with call processing. However, since both SCPs contain screening services, one or both may request that additional information (in the form of a PIN) be collected before the pass/fail status of the service can be determined. If only one SCP requests a PIN, the controlling algorithm would direct the MP to record the pass/fail response received from the screening service at the other SCP. When the pass/fail status of the screening service requesting the PIN is resolved, the MP would return to the SSP the appropriate pass/fail response. If both screening services were to request a PIN, a potentially confusing situation may exist, since the user would be requested to provide two PINs for two different screening services. The controlling logic would need to direct the MP to collect the two PINs and distinguish between them for transmittal to the appropriate SCPs.

D.2.2 Two Logging Services

Since a logging service is presumed not to have any impact on call processing, two logging services would both be queried simultaneously, and the response received from either one could be returned by the MP to the SSP.

D.2.3 Two Data Display Services

When data display services exist at both SCPs, one data display service may provide different values of the same parameter. Although a data display service does not affect call processing, only one value for a given parameter can be displayed on a display device. Therefore, when the same parameter is assigned different values by different data display services, the conflict among these values must be resolved in the controlling logic. If conflict resolution criteria are not provided, the controlling logic must assume some default, such as not displaying any value for conflicting parameters.

D.2.4 Each SCP Contains Conflicting Services

When each SCP contains services of the same conflicting service category (i.e., Number Translation, Carrier Selection, or Forwarding), the methodology requires that conflict resolution criteria be defined so that only one of the SCPs is queried.

What is claimed is:

1. A method for managing communications between a service origination node and a plurality of serving nodes wherein the serving nodes are simultaneously active for a particular trigger to thereby generate a reply to the service origination node, the method comprising the steps of
    determining control options for each trigger indicative of service categories by capturing service interaction principles supplied by a serving node services expert acting as a mentor, wherein the service interaction principles are based upon a requirement of executing at most one of the service categories in each of the serving nodes for each trigger, and
    controlling execution of each of the service nodes and each corresponding one of the service categories for the particular trigger with reference to the control options to generate the reply.

2. The method as recited in claim 1 wherein the serving nodes reside on a single service control point (SCP).

3. The method as recited in claim 1 further including the step of storing the control options as executable controlling logic and a corresponding customer record for each trigger.

4. The method as recited in claim 3 wherein said step of storing includes the step of storing the executable controlling logic and the corresponding customer record in a mediation point element interposed between the service origination nodes and the plurality of serving nodes.

5. The method as recited in claim 4 wherein said step of controlling includes the step of accessing the executable controlling logic and the corresponding customer record for the particular trigger.

6. A method for managing communications between a Service Switching Point (SSP) and a plurality of Service Control Points (SCPs) wherein the SCPs are simultaneously active for a particular trigger to thereby generate a reply to the SSP, the method comprising the steps of
    determining control options for each trigger indicative of service categories by capturing service interaction principles supplied by a SCP services expert acting as a mentor, wherein the service interaction principles are based upon a requirement of executing at most one of the service categories in each of the SCPs for each trigger, and
    controlling execution of each of the SCPs and each corresponding one of the service categories for the particular trigger with reference to the control options to generate the reply.

7. The method as recited in claim 6 further including the step of storing the control options as executable controlling logic and a corresponding customer record for each trigger.

8. The method as recited in claim 7 wherein said step of storing includes the step of storing the executable controlling logic and the corresponding customer record in a mediation point element interposed between the service origination nodes and the plurality of serving nodes.

9. The method as recited in claim 8 wherein said step of controlling includes the step of accessing the executable controlling logic and the corresponding customer record for the particular trigger.

10. A method for managing communications between a Service Switching Point (SSP) and a plurality of Service Control Points (SCPs) wherein the SCPs are simultaneously active for a particular trigger to thereby generate a reply to the SSP, the method comprising the steps of
    determining behavioral control options indicative of the service categories and corresponding query control options for each of the behavioral control options by capturing service interaction principles supplied by a SCP services expert acting as a mentor, wherein the service interaction principles are based upon a requirement of executing at most one of the service categories in each of the SCPs for each trigger,
    storing one of the behavioral options and a corresponding one of the query control options in executable controlling logic as selected for each subscriber, and
    operating the controlling logic associated with a particular subscriber to control the execution of each of the SCPs and each corresponding one of the service categories to thereby generate the reply.

11. The method as recited in claim 10
    wherein the step of storing one of the query control options includes the step of generating query cycles for operating the SCPs in a predetermined order, and
    wherein the step of operating the controlling logic includes the step of executing the query cycles in said predetermined order.

12. The method as recited in claim 10 wherein the behavioral control options are representative of the joint behavior of the service categories operating in each of the SCPs, wherein the query control options are representative of the order in which the SCPs are queried, and wherein the step of storing includes the step of associating one of the behavioral options and a corresponding one of the query control options with each subscriber.

13. The method as recited in claim 10 wherein said step of controlling includes the steps of
    (a) selecting the stored one of the behavioral options and the corresponding one of the query options for the particular subscriber, (b) if the selected one of the query options requires simultaneous querying of the SCPs, continuing with step (c); otherwise, proceeding to step (d), (c) simultaneously querying each of the SCPs handling the selected one of the query options, and receiving a response from each of these SCPs; proceeding to step (e), (d) querying a single SCP based upon the selected one of the query options and receiving a response; continuing with step (e), (e) if additional queries are required to the SCPs, determining information to pass during a next query cycle, and returning to step (b); otherwise, proceeding to step (f), and (f) determining the reply for the SSP from the responses obtained by querying the SCPs.

14. A method for processing a query generated by a Service Switching Point (SSP) to produce a reply to operate the SSP, the SSP being served by a plurality of Service Control Points (SCPs) cooperatively arranged to execute a set of service categories, the SCPs being simultaneously active for each trigger, the query being produced in response to a particular trigger effected by a particular subscriber invoking the set, the method comprising the steps of determining control options indicative of the service categories by capturing service interaction principles supplied by a SCP services expert acting as a mentor, wherein the service interaction principles are based upon a requirement of executing at most one of the service categories in each of the SCPs for each trigger, storing one of the control options in executable controlling logic as selected for the particular subscriber, and operating the controlling logic associated with the particular subscriber to control the execution of each of the SCPs and each corresponding one of the service categories to thereby generate the reply.

15. A method for processing a query generated by a Service Switching Point (SSP) to produce a reply to operate the SSP, the SSP being served by a plurality of Service Control Points (SCPs) cooperatively arranged to execute a set of service categories, the SCPs being simultaneously active for each trigger, the query being produced in response to a particular trigger effected by a particular subscriber invoking the set, the method comprising the steps of determining behavioral control options indicative of the service categories and corresponding query control options for each of the behavioral control options by capturing service interaction principles supplied by a SCP services expert acting as a mentor, wherein the service interaction principles are based upon a requirement of executing at most one of the service categories in each of the SCPs for each trigger, storing one of the behavioral options and a corresponding one of the query control options in executable controlling logic as selected for the particular subscriber, and operating the controlling logic associated with the particular subscriber to control the execution of each of the SCPs and each corresponding one of the service categories to thereby generate the reply.

16. The method as recited in claim 15
wherein the step of storing one of the query control options includes the step of generating query cycles for operating the SCPs in a predetermined order, and
wherein the step of operating the controlling logic includes the step of executing the query cycles in said predetermined order.

17. The method as recited in claim 15 wherein the behavioral control options are representative of the joint behavior of the service categories operating in each of the SCPs, wherein the query control options are representative of the order in which the SCPs are queried, and wherein the step of storing includes the step of associating one of the behavioral options and a corresponding one of the query control options with the particular subscriber.

18. A method for processing a query generated by a Service Switching Point (SSP) to produce a reply to operate the SSP, the SSP being served by a plurality of Service Control Points (SCPs) cooperatively arranged to execute a set of service categories, the SCPs being simultaneously active for each trigger, the query being produced in response to a particular trigger effected by a particular subscriber invoking the set, the method comprising the steps of determining control options indicative of the service categories by capturing service interaction principles supplied by a SCP services expert acting as a mentor, wherein the service interaction principles are based upon a requirement of executing at most one of the service categories in each of the SCPs for each trigger, storing one of the control options in executable controlling logic as selected for each of the subscribers, and operating the controlling logic associated with the particular subscriber to control the execution of each of the SCPs and each corresponding one of the service categories to thereby generate the reply.

19. A method for managing communications between a service origination node and two serving nodes wherein the serving nodes are simultaneously active for a particular trigger to thereby generate a reply to the service origination node, the method comprising the steps of determining control options for each trigger indicative of service categories by capturing service interaction principles supplied by a serving node services expert acting as a mentor, wherein the service interaction principles are based upon a requirement of executing one or more of the service categories in each of the serving nodes for each trigger, selecting one of the control options by the expert for each trigger, and controlling execution of each of the service nodes and each corresponding one of the service categories for the particular trigger with reference to the control options to generate the reply.

20. A method for managing communications between a Service Switching Point (SSP) and two Service Control Points (SCPs) wherein the SCPs are simultaneously active for a particular trigger to thereby generate a reply to the SSP, the method comprising the steps of determining control options for each trigger indicative of service categories by capturing service interaction principles supplied by a SCP services expert acting as a mentor, wherein the service interaction principles are based upon a requirement of executing one or more of the service categories in each of the SCPs for each trigger, selecting one of the control options by the expert for each trigger, and controlling execution of each of the SCPs and each corresponding one of the service categories for the particular trigger with reference to the control options to generate the reply.

21. The method as recited in claim 20 wherein said step of controlling includes the steps of (a) if simultaneous querying of the SCPs for the particular subscriber is required, continuing with step (b); otherwise, proceeding to step (d), (b) simultaneously querying each of the SCPs and receiving response from the SCPs, (c) determining the reply for the SSP from the responses obtained by querying the SCPs and returning the reply, (d) determining a first one of the SCPs to be queried, querying the first SCP, and receiving a first response, (e) if the second one of the SCPs is to be queried, proceeding to step (f); otherwise, returning the reply based upon the first response, and (f) passing information from the first SCP to the second SCP, if needed, querying the second of the SCPs, receiving a second response, and returning the reply based upon the first response and the second response.

22. A system for managing communications between a service origination node and a plurality of serving nodes wherein the serving nodes are simultaneously active for a particular trigger to thereby generate a reply to the service origination node, the system comprising means for determining control options for each trigger indicative of service categories by capturing service interaction principles supplied by a serving node services expert acting as a mentor, wherein the service interaction principles are based upon a requirement of executing at most one of the service categories in each of the serving nodes for each trigger, and control means, responsive to said means for determining, for controlling execution of each of the service nodes and each corresponding one of the service categories for the particular trigger with reference to the control options to generate the reply.

23. A system for managing communications between a service origination node and two serving nodes wherein the serving nodes are simultaneously active for a particular trigger to thereby generate a reply to the service origination node, the system comprising means for determining control options for each trigger indicative of service categories by capturing service interaction principles supplied by a serving node services expert acting as a mentor, wherein the service interaction principles are based upon a requirement of executing one or more of the service categories in each of the serving nodes for each trigger, selection means, responsive to said means for determining, for selecting one of the control options by the expert for each trigger, and control means, responsive to said means for selecting, for controlling execution of each of the service nodes and each corresponding one of the service categories for the particular trigger with reference to the control options to generate the reply.

\* \* \* \* \*